United States Patent
Williams

(10) Patent No.: US 12,248,333 B2
(45) Date of Patent: Mar. 11, 2025

(54) PROCESSOR EMBEDDED STREAMING BUFFER

(71) Applicant: Intel Corporation, Santa Clara, CA (US)

(72) Inventor: Joseph Williams, Holmdel, NJ (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 17/358,218

(22) Filed: Jun. 25, 2021

(65) Prior Publication Data
US 2022/0413852 A1    Dec. 29, 2022

(51) Int. Cl.
G06F 9/30 (2018.01)
G06F 9/355 (2018.01)
G06F 9/38 (2018.01)
G06F 15/78 (2006.01)

(52) U.S. Cl.
CPC ...... *G06F 9/30036* (2013.01); *G06F 9/30109* (2013.01); *G06F 9/355* (2013.01); *G06F 9/3814* (2013.01); *G06F 15/7807* (2013.01)

(58) Field of Classification Search
CPC .. G06F 9/30036; G06F 9/30109; G06F 9/355; G06F 9/3824; G06F 15/7807
See application file for complete search history.

(56) References Cited

U.S. PATENT DOCUMENTS

| | | | |
|---|---|---|---|
| 6,665,749 B1* | 12/2003 | Ansari | G06F 13/1678 710/33 |
| 2013/0159668 A1* | 6/2013 | Muff | G06F 15/8053 712/7 |
| 2014/0189231 A1* | 7/2014 | Maydan | G06F 9/3893 711/110 |
| 2019/0171448 A1* | 6/2019 | Chen | G06F 9/30036 |
| 2019/0354508 A1* | 11/2019 | Mahurin | G06F 9/3001 |
| 2022/0147810 A1* | 5/2022 | Zaidy | G06N 3/063 |
| 2023/0004391 A1* | 1/2023 | Zbiciak | G06F 12/0875 |

* cited by examiner

*Primary Examiner* — Jacob Petranek
(74) *Attorney, Agent, or Firm* — Banner & Witcoff Ltd.

(57) ABSTRACT

Techniques are disclosed for the use of local buffers integrated into the execution units of a vector processor architecture. The use of local buffers results in less communication across the interconnection network implemented by vector processors, and increases interconnection network bandwidth, increases the speed of computations, and decreases power usage.

20 Claims, 21 Drawing Sheets

PROCESSOR EMBEDDED STREAMING BUFFER

TECHNICAL FIELD

The disclosure described herein generally relates to vector processor architectures and, in particular, to techniques for exploiting the properties of streaming data using a local buffer embedded in the execution units of the vector processor architecture to reduce the use of a centralized memory, shared interconnection networks, and power consumption.

BACKGROUND

A vector processor or array processor is a central processing unit (CPU) that implements an instruction set containing instructions that operate on one-dimensional arrays of data referred to as "vectors." This is in contrast to scalar processors having instructions that operate on single data items. Vector processors can greatly improve performance on certain workloads, notably numerical simulation and similar tasks, by utilizing a number of execution units that independently execute specific functions on incoming data streams to achieve a processing flow. However, current implementation of vector processors to achieve a processing flow presents various drawbacks.

BRIEF DESCRIPTION OF THE DRAWINGS/FIGURES

The accompanying drawings, which are incorporated herein and form a part of the specification, illustrate the various implementations of the present disclosure and, together with the description, and further serve to explain the principles of the implementations and to enable a person skilled in the pertinent art to make and use the techniques in accordance with the implementations as discussed herein.

FIG. 4C illustrates aligned and unaligned vector data sample access, in accordance with the disclosure.

FIGS. 6A-6K illustrate the use of a buffer with a vector processor architecture to perform digital finite impulse response (FIR) filter vector processing operations, in accordance with the disclosure.

The various techniques in accordance with the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the present disclosure. However, it will be apparent to those skilled in the art that the various techniques and implementations, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Vector Processing Operation

Generally speaking, conventional CPUs manipulate one or two pieces of data at a time. For instance, conventional CPUs may receive an instruction that essentially says "add A to B and put the result in C," with 'C' being an address in memory. Typically the data is rarely sent in raw form, and is instead "pointed to" via passing an address to a memory location that holds the actual data. Decoding this address and retrieving the data from that particular memory location takes some time, during which a conventional CPU sits idle waiting for the requested data to be retrieved. As CPU speeds have increased, this memory latency has historically become a large impediment to performance.

Thus, to reduce the amount of time consumed by these steps, most modern CPUs use a technique known as instruction pipelining in which the instructions sequentially pass through several sub-units. The first sub-unit reads and decodes the address, the next sub-unit "fetches" the values at those addresses, while the next sub-unit performs the actual mathematical operations. Vector processors, which are otherwise known as array processors, take this concept even further. For instance, instead of pipelining just the instructions, vector processors also pipeline the data itself. For example, a vector processor may be fed instructions that indicate not to merely add A to B, but to add all numbers within a specified range of address locations in memory to all of the numbers at another set of address locations in memory. Thus, instead of constantly decoding the instructions and fetching the data needed to complete each one, a vector processor may read a single instruction from memory. This initial instruction is defined in a manner such that the instruction itself indicates that the instruction will repeatedly be executed on another item of data, at an address one increment larger than the last. This allows for significant savings in decoding time.

Figure 1:
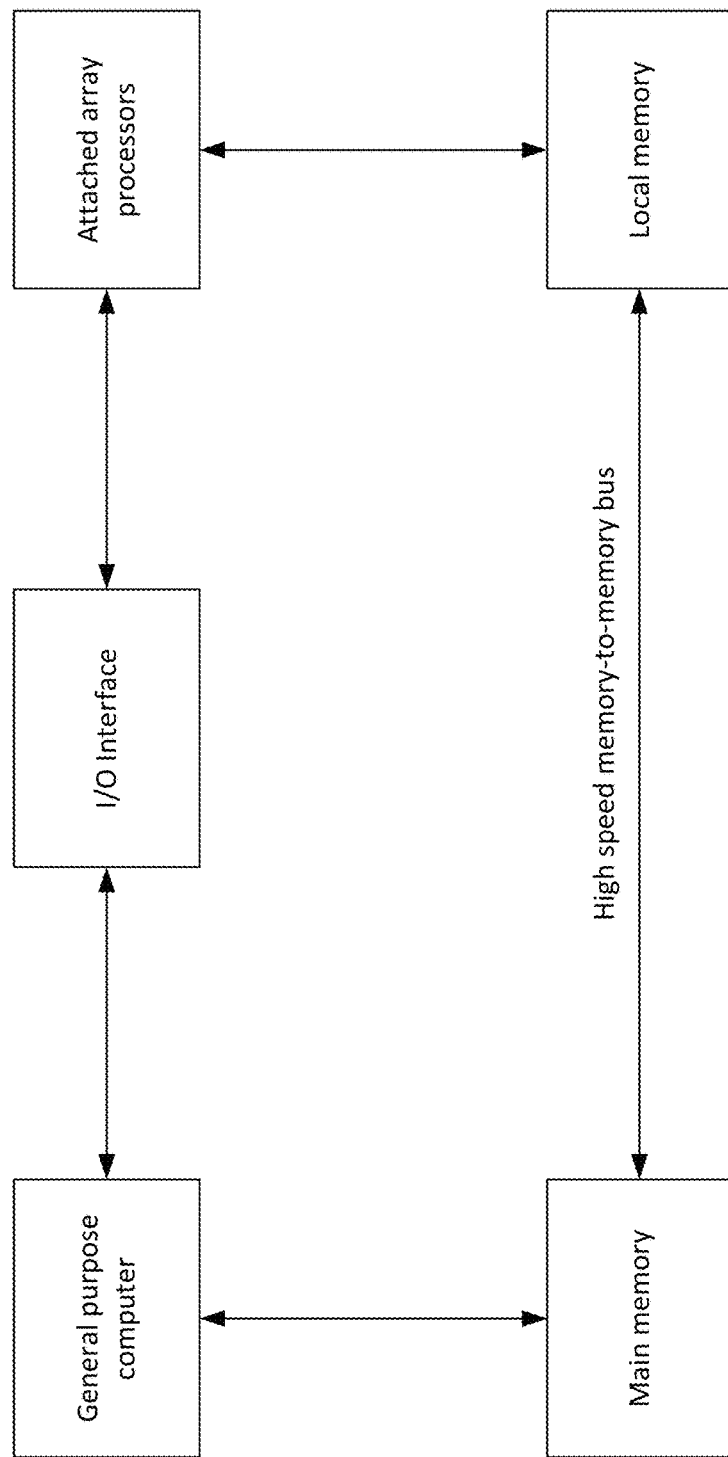
FIG. 1 illustrates an example of a conventional vector processor architecture.
Figure 2:
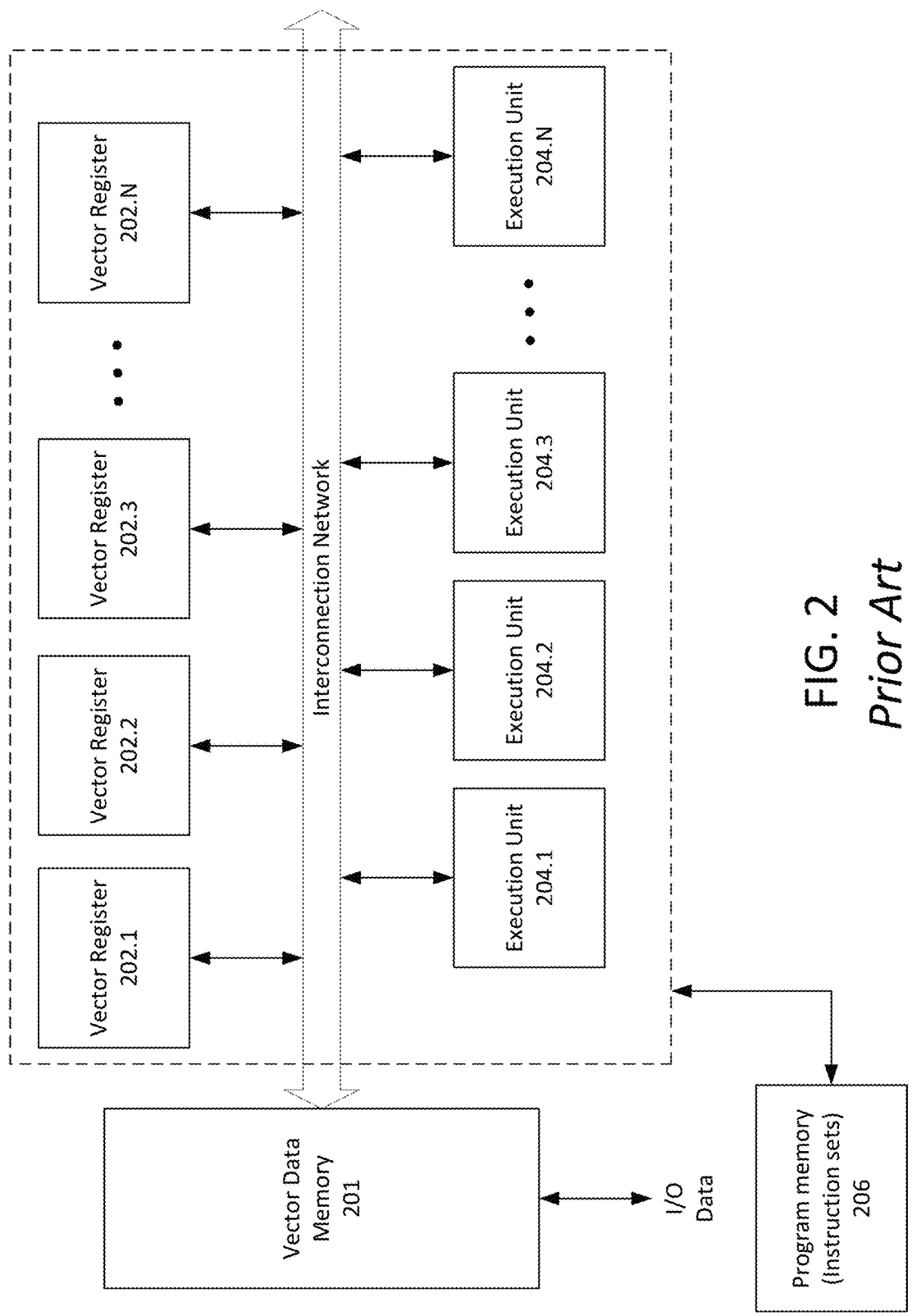
FIG. 2 illustrates another example of a conventional vector processor architecture.

Vector processors may be implemented in accordance with various architectures, and the various vector processor architectures as discussed throughout the disclosure as further described herein may be implemented in accordance with any of these architectures or combinations of these architectures. FIGS. 1 and 2 provide two different implementations of a vector processor architecture. FIG. 1 illustrates an attached vector processor, which is attached to a general purpose computer, for instance, for the purpose of enhancing and improving the performance of that computer in numerical computational tasks. The attached vector processor achieves high performance by means of parallel processing with multiple functional units, which may be alternatively referred to herein as execution units or processing units.

FIG. 2, on the other hand, shows an example of a single instruction stream, multiple data streams (SIMD) vector processor. The vector processor architecture 200 as shown in FIG. 2 may have an architecture consisting of one or more execution units. Each execution unit is capable of executing one instruction. Each instruction can be a control, load/store, scalar or a vector instruction. Therefore, a processor with N execution units 204.1-204.N as shown in FIG. 2 can issue as many as N instructions every clock cycle. The execution units 204.1-204.N function under the control of a common control unit (such as processing circuitry), thus providing a single instruction stream to control each of the execution units 204.1-204.N. The I/O data as shown in FIG. 2 is typically identified with data communicated between the vector processor 200 and another data source or processor (which may be the common control unit or another processor) depending upon the particular application. The vector data memory 201 thus stores data received as input to be processed by the execution units 204.1-204.N, and data that is output or read from the vector data memory 201 after the data is processed. The vector processor architecture 200 as shown in FIG. 2 is an example of a load-store architecture used by vector processors, which is an instruction set architecture that divides instructions into two categories: memory access (loading and storing data between the vector data memory 201 and the vector registers 202.1-202.N) and the vector processing operations performed by the execution units 204.1-204.N using the data retrieved from and the results stored to the vector registers 202.1-202.N.

Thus, the load-store instruction architecture facilitates data stored in the vector data memory 201 that is to be processed to be loaded into the vector registers 202.1-202.N using load operations, transferred to the execution units 204.1-204.N, processed, written back to the vector registers 202.1-202.N, and then written back to the vector data memory 201 using store operations. The location (address) of the data and the type of processing operation to be performed by each execution unit 204.1-204.N is part of an instruction stored as part of the instruction set in the program memory 206. The movement of data between these various components may be scheduled in accordance with a decoder that accesses the instructions sets from the program memory, which is not shown in further detail in FIG. 2 for purposes of brevity. The interconnection network, which supports the transfer of data amongst the various components of the vector processor architecture 200 as shown in FIG. 2, is generally implemented as a collection of data buses and may be shared among a set of different components, ports, etc. In this way, several execution units 204.1-204.N may write to a single vector register 202, and the data loaded into several vector registers 202.1-202.N may be read by and processed by several of the execution units 204.1-204.N.

The use of instruction sets in accordance with the vector processor architecture 200 is generally known, and therefore an additional description of this operation is not provided for purposes of brevity. Regardless of the particular implementation, vector processors can greatly improve performance on certain workloads but have various drawbacks. For instance, it is very common in many signal processing applications for a specific vector data sample to be used many times in the calculation of an expression. In one scenario, and as further discussed herein, for the implementation of a finite impulse response (FIR) filter each vector data sample is multiplied by every coefficient of the filter. Thus, if a filter has 127 coefficients, then each vector data sample will be used as the input to 127 multiply-accumulate operations. This property is referred to as "data reuse." In conventional vector processors, such as the vector processor architecture 200 as shown in FIG. 2, data reuse is achieved by storing the data in the vector registers 202.1-202.N, which has several drawbacks.

One drawback of this scheme is that, to enable practical compiler design, the vector registers 202.1-202.N must be implemented with aligned access. This is illustrated in FIG. 4C with respect to a scenario in which the vector registers 202.1-202.N store 4-entry 8-word register files in an aligned manner, which are then read from the vector registers 202.1-202.N in an aligned manner to provide as 8-element (such as 8 vector data sample) result. In this scenario as shown in FIG. 4C, the resister file stored in the vector registers 202.1-202.N is implemented as a 2D array of words. For such an approach, the vector data must reside entirely within the same entry of each element in the vector register file. However, it is common in many algorithms for the data to span across 2 or more entries of a register file as shown in FIG. 4C and referred to as unaligned access. Conventional vector processors, such as the vector processor architecture 200 as shown in FIG. 2, perform unaligned access by reading two vectors of data from the register files although there is only one vector of useful data, which is inefficient in terms of both cost and power. Another drawback is that convention processor architectures do not exploit the properties of streaming data applications, which is discussed in further detail herein with respect to the vector processor architecture 300 as shown in FIG. 3.

Furthermore, it is common for several execution units 204.1-204.N to concurrently transfer data across the interconnection network to the vector register files 202.1-202.N, which may result in data bottlenecks. The disclosure as further described herein addresses these issues by implementing a local or "private" buffer as part of each execution unit that enables the storage of vector data samples in the buffers in an unaligned manner, which is further discussed in further detail below with reference to FIG. 3. This increases efficiency as it enables each execution unit to locally access the contents of its own local buffer to execute a single instruction loop, which reduces the use of the interconnection network and also reduces power consumption.

Local Buffer Functionality

Figure 3:
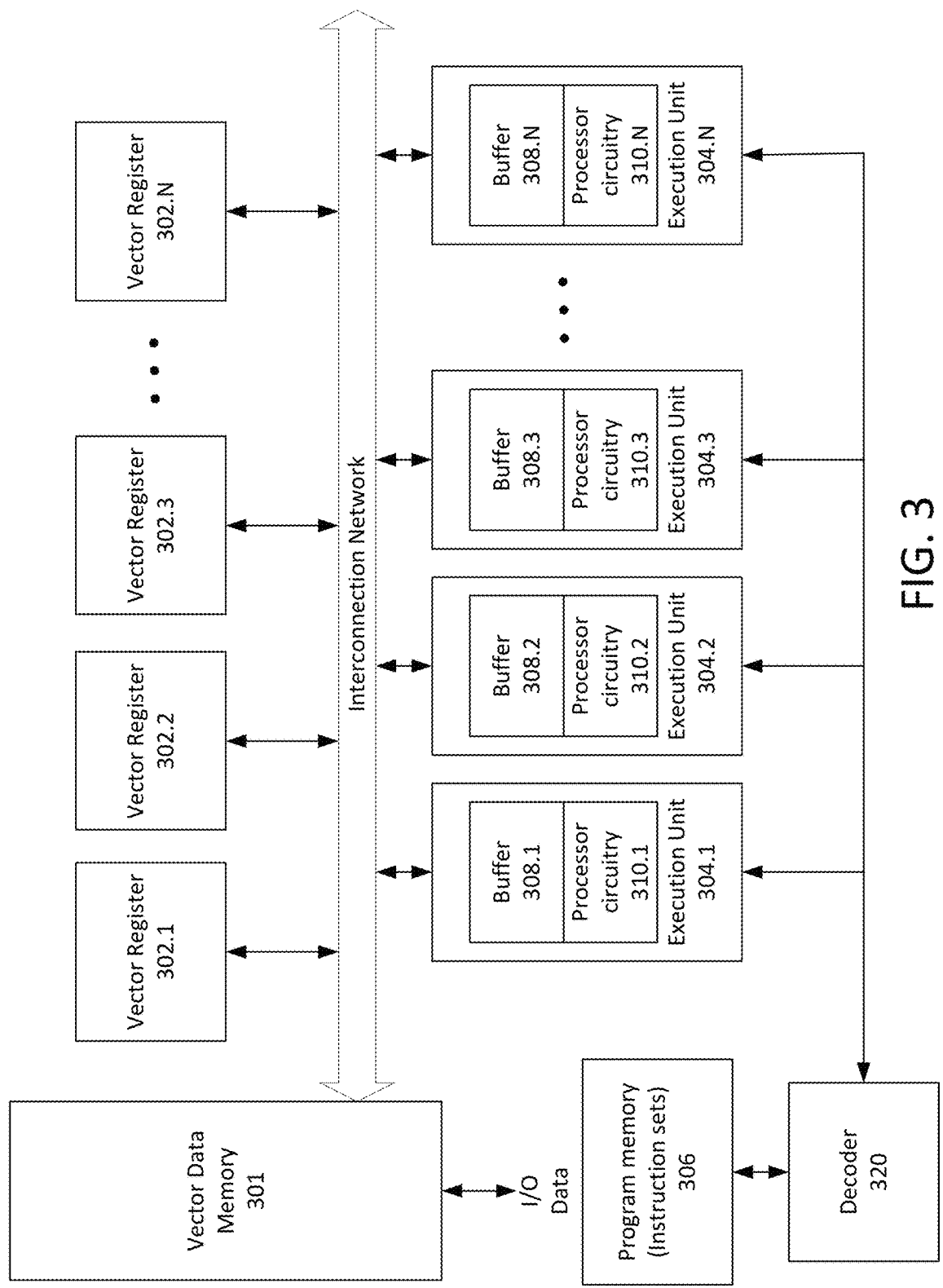
FIG. 3 illustrates a vector processor architecture in accordance with the disclosure.

FIG. 3 illustrates a vector processor architecture in accordance with the disclosure. The vector processor architecture as shown in FIG. 3 may be configured in accordance with any suitable type of vector processor application and implementation, which may utilize any suitable type of processor, CPU, etc. This may include standard, reduced instruction set computer (RISC), such as super scalar, very long instruction word (VLIW), graphics processing units (GPUs), etc. As noted further below, the vector processor architecture 300 may be implemented as part of a more specialized component such as a digital signal processor (DSP) and/or a radio transceiver that implement digital signal processing to perform filtering operations, which may include the application and/or calculation of digital pre-distortion (DPD) coefficients or terms, the application or calculation of digital filter taps or coefficients, etc.

As noted above with reference to the vector processor architecture 200 as shown in FIG. 2, the vector processor architecture 300 as shown in FIG. 3 may also include any suitable number N of vector registers 302.1-302.N and execution units 304.1-304.N. The load-store machine architecture facilitates the vector processor architecture 300 moving data between the vector data memory 301, the vector registers 302.1-302.N, and the execution units 304.1-304.N. The vector registers 302.1-302.N may alternatively be referred to as vector register files, and may represent any suitable type of storage such as volatile or non-volatile memory, and which may have any suitable size, addressable space, and address configuration depending upon the size of the data samples that are loaded into the vector registers 302.1-302.N, which may be stored as data vectors in one or more vector register files, and which is typically a function of the particular instruction set and/or protocol such as vector size, word size, etc.

The vector processor architecture 300 may also include any suitable number of execution units 304.1-304.N, which may implement any suitable type of vector processors, vector processing circuitry, etc., illustrated in FIG. 3 as the processor circuitry 310.1-310.N, and which may be implemented to perform specific types of vector data processing operations based upon respectively received commands or instructions. These commands or instructions may originate from a decoder or other suitable processor that functions to arbitrate or otherwise schedule the processing of I/O data that is stored in the vector data memory 301 and transferred from the vector data memory to the vector registers 302.1-302.N using the interconnection network. The execution units 304.1-304.N may alternatively be referred to herein as vector units, vector processing units, or functional units, or further alternatively as execution unit circuitry, vector unit circuitry, vector processing unit circuitry, functional unit circuitry, or simply as one or more processors. The execution units 304.1-304.N may be implemented in accordance with any suitable type of vector processor architecture and include any suitable number and/or type of vector processing circuitry, as shown in FIG. 3 as the processor circuitry 310.1-310.N, and which may include known vector processor architectures and/or types, to perform their respective vector processing operations.

Each of the execution units 304.1-304.N is configured to perform a specific type of mathematical operation via bit manipulation such as multiplication, addition, etc. Each of the execution units 304.1-304.N includes respective processor circuitry 310.1-310.N and is configured to execute, for each clock cycle, a specific type of instruction based upon the particular mathematical operation that is to be performed. Thus, the execution units 304.1-304.N are configured to independently execute one vector processor instruction each clock cycle in parallel with one another. Because these instruction may be different than one another, the use of multiple execution units 304.1-304.N means that the vector processor architecture 300 may execute N number of instructions in parallel each clock cycle.

The vector processor architecture 300 may form part of or the entirety of a system on a chip (SoC), which may be part of a larger overall system in which the vector processor architecture 300 is implemented. That is, the vector processor architecture 300 may be instantiated as part of a broader SoC that may include several other processors, ports, I/O, etc. In such a scenario, the I/O data coupled to the vector data memory 301 as shown in FIG. 3 may represent a SoC bus, which functions to write data to the vector data memory 301 and read data from the vector data memory 301. The communication between the vector data memory 301 and another entity using the SoC bus may be via Direct Memory access (DMA) or other suitable means. Thus, and as noted above for the vector processor architecture 200, the interconnection network may be a shared resource, and reducing the data transferred over the interconnection network thus reduces computational latency and power usage requirements.

Therefore, in contrast to the vector processor architecture 200 as shown in FIG. 2, each of the execution units 304.1-304.N as shown in FIG. 3 includes a buffer 308.1-308.N, which may be implemented as any suitable type of memory having suitable size, addressable space, and address configuration. The buffers 308.1-308.N may alternatively be referred to as streaming or circular buffers, with the functionality associated with these terms being further discussed herein. Each of the execution units 304.1-304.N also includes respective processor circuitry 310.1-310.N, which performs the aforementioned instructions and thus constitutes the portion of the execution units 304.1-304.N that interfaces with the streaming buffers 308.1-308.N, performs the requested vector processor instruction each clock cycle, and then writes the result back to a respective buffer 308.1-308.N as discussed in further detail below. The buffers 308.1-308.N may be implemented as memory of a size smaller than each of the vector registers 302.1-302.N, which may include a size just large enough to hold vector data samples until the vector data samples are fully processed. The connections between the buffers 308.1-308.N and each respective processor circuitry 310.1-310.N are not shown in detail in FIG. 3 for purposes of brevity. However, because each buffer 308.1-308.N is local with respect to each execution unit 304.1-304.N, the data bandwidth between each buffer 308.1-308.N and its respective processor circuitry 310.1-310.N may be increased beyond the data bandwidth that would be available using the interconnection network, which represents an arbitrated and complex combination of shared data lanes. Furthermore, the use of the local buffers 308.1-308.N may facilitate the vector processor architecture 300 as shown in FIG. 3 implementing vector processing operations using software-driven approaches in contrast to conventional vector processor architectures that require dedicated hardware that may be expensive, complex, and consume a great deal of power to perform vector processing operations.

It is noted that for streaming applications the data is processed in a sequential order. Thus, a natural memory structure for streaming data is a circular buffer. The buffers 308.1-308.N may thus be implemented as circular buffers and be configured such that data is written into or towards the end (or other address location) of the circular buffer and read from or towards the beginning (or other address location) of the circular buffer in terms of the buffer's addressable space. Another advantage of using such a circular buffer configuration includes the ability to utilize simplified modulo addressing to read data from and write data to the circular buffer. As it is not practical for compilers to support circular addressing for the vector registers 302.1-302.N, the use of the local buffers 308.1-308.N, which may locally implement such circular addressing, is particularly advantageous and overcomes this issue. Moreover, in many streaming applications such as FIR filters, mixers, and DPD actuators used in Digital Front-Ends (DFEs), the processing may be formulated as a single instruction that is repeatedly executed in a single execution unit 304.1-304.N. Again, transferring data to and from the vector registers 302.1-302.N over the shared interconnection network is expensive in terms of both cost and power due to the complex architecture of interconnection networks and their typical implementation to support "many-to-many" communication features in accordance with vector processor architecture and design.

It is also noted that the use of the buffers 308.1-308.N differs from the use of a cache memory in various ways. A cache memory facilitates random access of the data stored therein. This feature requires cache memory to implement complex hardware that allows a check to be performed regarding whether the cache currently contains data that needs to be retrieved. Such features also result in processor stalls while waiting for the cached data to be retrieved. The complex hardware used for cache operation enables prefetch and predictive operations to be executed, which adds to their cost thereby limiting their practical implementation. The vector processor architecture 300 described herein may leverage the use of the buffers 308.1-308.N by exploiting the sequential nature of vector processing operations for certain applications, such as filter processor computations, that utilize streaming data. As discussed herein, the use of the buffers 308.1-308.N as part of the vector processor architecture 300 exploits the sequential and predictive nature of the computations performed for certain applications to eliminate the need for costly and complex data caches. The vector processor architecture 300 as described herein may be implemented in accordance with any suitable type of application that utilizes vector processing operations in accordance with any suitable type of vector processor instructions. The vector processor instructions may be generated by any suitable controller, processor component, etc., such as the decoder 320 as shown in FIG. 3, and include a predetermined set of instructions or code, opcodes, etc. The vector processor instructions may include various types of commands, pointers to address locations in the buffers 308.1-308.N from which the processing circuitry 310.1-310.N is to read and write data, the particular type of mathematical function or vector processing operation that should be performed by a respective execution unit 304 to which the vector instruction is sent, etc. Additional detail regarding the specific format and content of the vector processor instructions is discussed in further detail below. Each execution unit 304.1-304.N is configured to execute one or more vector processing operations per each received vector processor instruction, which may be sent to the execution units 304.1-304.N by the decoder 320 each clock cycle in accordance with a common system clock.

Figure 4A:
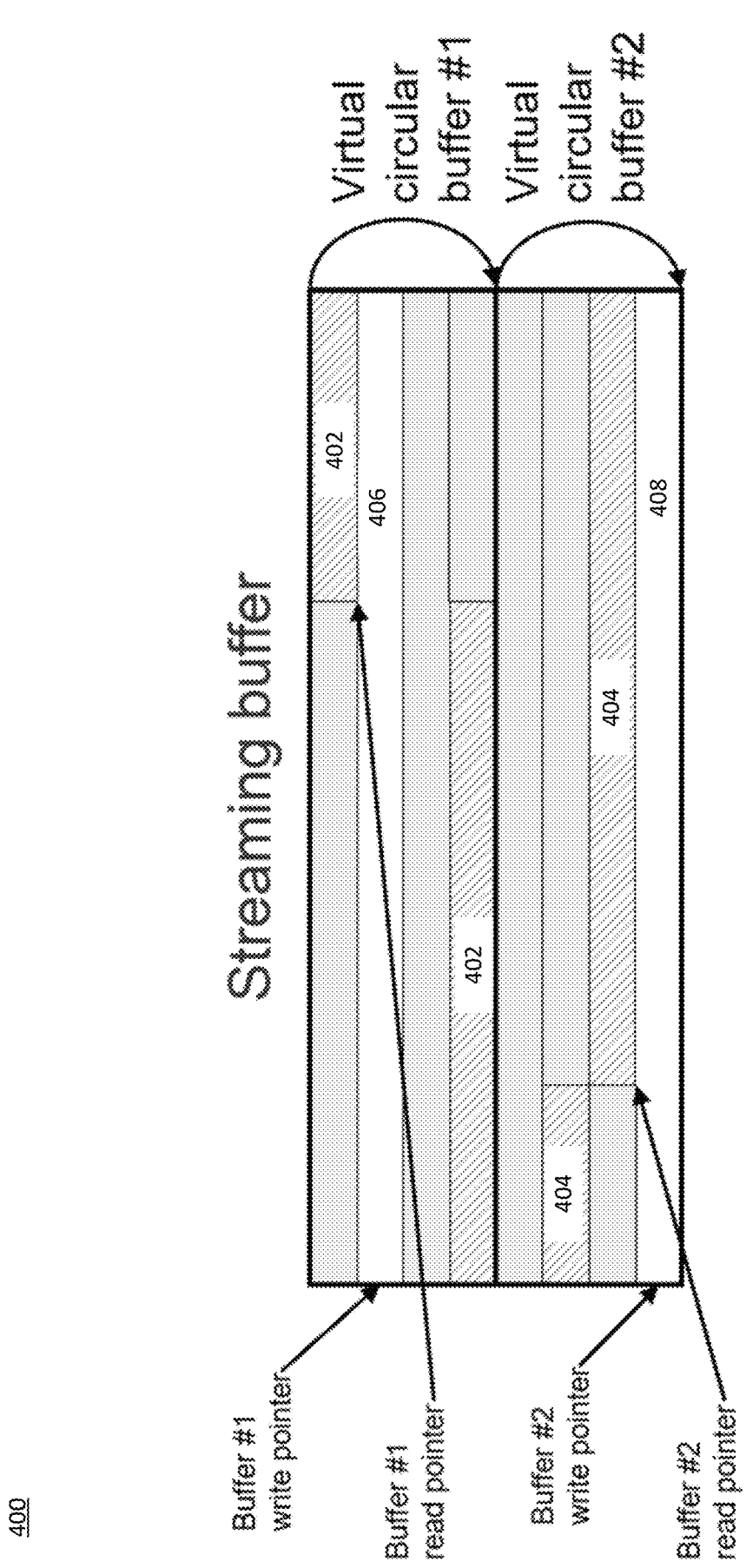
FIG. 4A illustrates a configuration of two streaming buffers, in accordance with the disclosure.
Figure 4B:
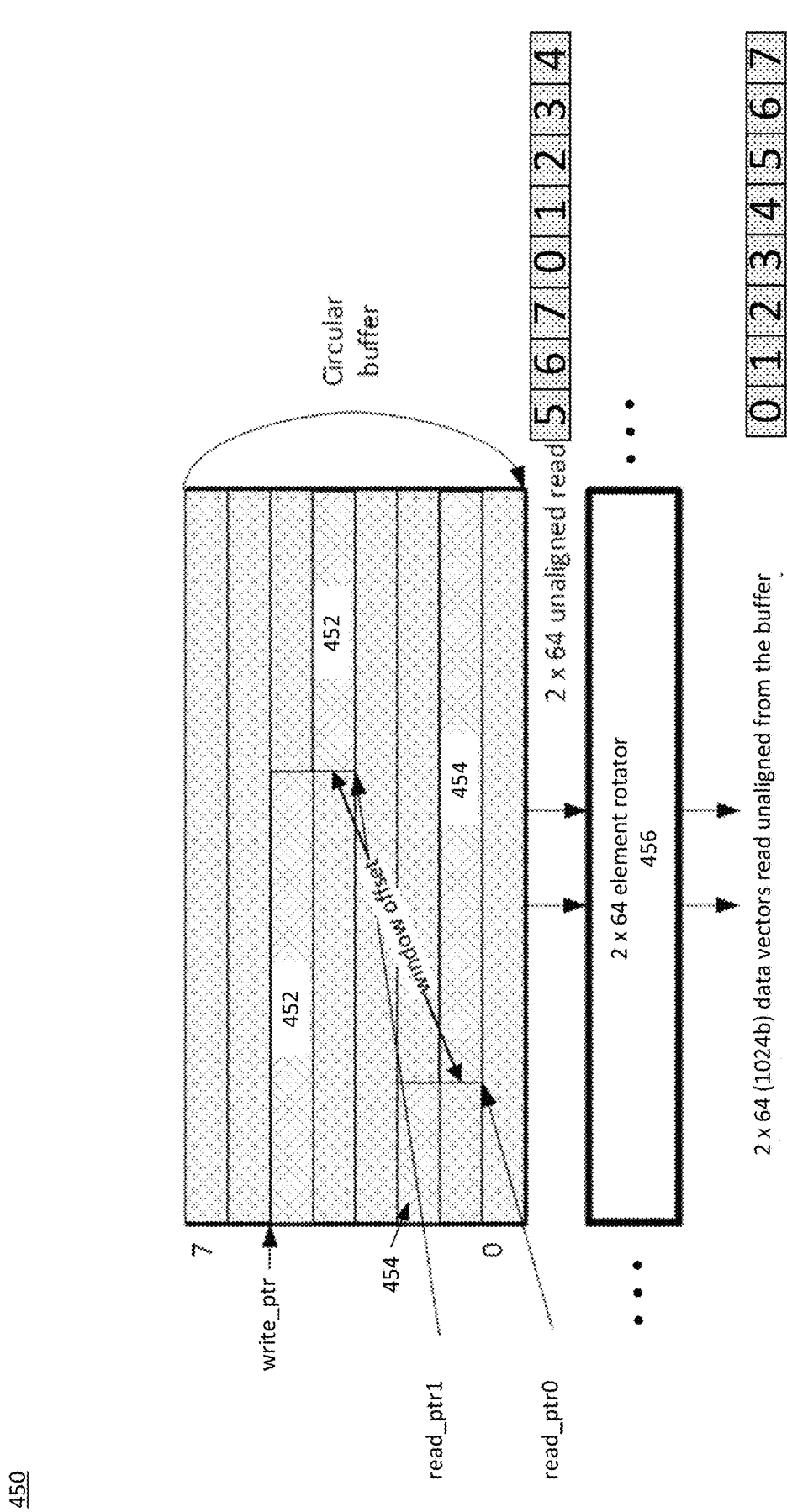
FIG. 4B illustrates a configuration of a streaming buffer showing a rotator to compensate for misalignment of read vector data samples, in accordance with the disclosure.
Figure 4C:
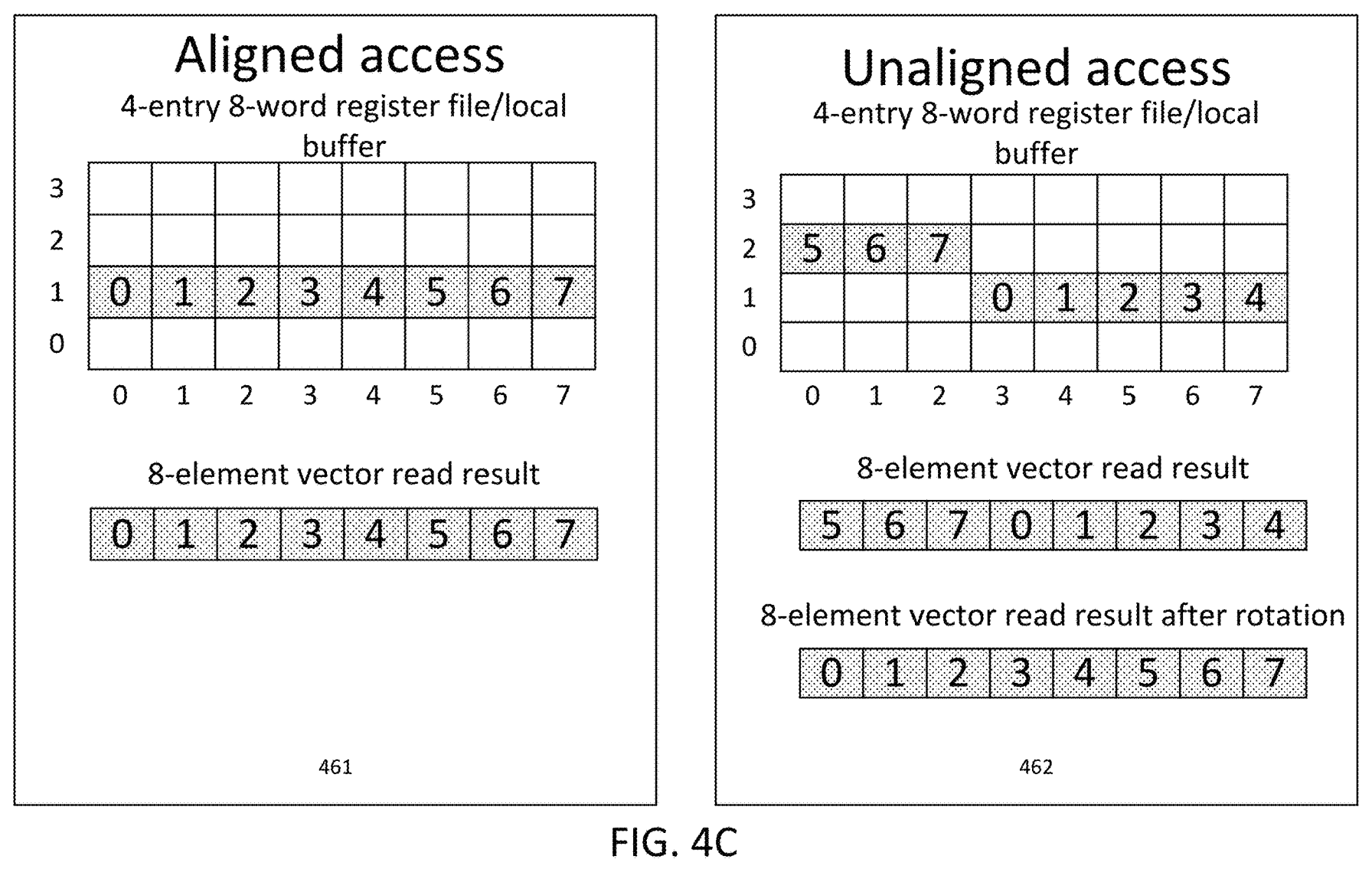

The buffers 308.1-308.N may each be further partitioned into any suitable number of additional buffers or "sub-buffers," which may be referred to herein as virtual buffers or buffer partitions. Each buffer or virtual buffer, as the case may be, which is identified with each respective buffer 308.1-308.N, may have any suitable type of address organization and be identified with a range of addresses representing the overall capacity of that particular buffer or virtual buffer. For ease of explanation, the buffer or virtual buffers discussed herein are referred to as having a range of addresses identified with "rows" and "columns," although this is not a limitation of the implementation of the vector processor architecture 300 and any suitable type of addressing scheme or organization may be implemented by the buffers 308.1-308.N. Alternatively, the rows as discussed herein may be alternatively referred to as words, with one word or more words occupying each row. Regardless of the particular address organization that is utilized, the buffers or virtual buffers may store sets of vector data samples over any suitable range of address locations, which need not be "aligned" with the beginning of a row, as shown in FIGS. 4A-4B. That is, and with reference to FIG. 4A, the vector data sets 402, 404 may represent any suitable number of vector data samples, and may constitute one or more data vectors that are retrieved from the vector registers 302.1-302.N. The buffers 400, 450 as shown in FIGS. 4A-4B may thus be identified with any one of the buffers 308.1-308.N as discussed herein with reference to FIG. 3. Thus, the buffers or virtual buffers may be referred to as "circular," meaning that vector data samples may be stored in a manner that "wraps" across the rows and/or columns of addressable space in an unaligned manner and may span the end of a particular addressable range (such as a range of addresses for a row) and the beginning of another addressable range (such as another row), as shown in FIG. 4A for the vector data sets 402, 404.

This is enabled via the use of the aforementioned read pointers that are contained or otherwise encoded as part of each received vector processor instruction. The vector processor instructions may also include or otherwise encode write pointers, which specify the location within buffer to store the results of the vector processing operations performed on the vector data samples, the results being illustrated in FIG. 4A as the vector data samples 406, 408. The write pointers are shown in FIG. 4A as being aligned with the starting row addresses of the two virtual buffers, although this is not a limitation and the buffers 308.1-308.N may receive vector processor instructions with write pointers to any starting vector address within the buffer or virtual buffer, as the case may be. However, it may be particularly advantageous to reserve a range of addresses within the virtual buffer as being dedicated for writing the results of performing the vector processing operations, or even reserving another separate virtual buffer for such results, as further discussed herein.

Moreover, each buffer or virtual buffer may be identified with a distinct vector data stream, with the vector processing operations being sequentially applied to vector data samples for each distinct data stream to calculate results in accordance with the type of vector processing operation that is performed. The vector processing operations may be sequentially executed over several respective clock cycles, with new vector data samples being retrieved from the vector registers 302.1-302.N and, once no longer needed for further vector processing operations, the previous vector data samples stored in the buffer or virtual buffer may be overwritten with the new (i.e. more recently retrieved) vector data samples. In this way, the buffer or virtual buffers as described herein function in a circular manner by advancing, within each buffer, the next range of addresses used to store new vector data samples, and then returning to the original starting address over time as subsequent vector processing operations are performed and completed on older vector data samples. Further details of the streaming nature of the buffers and virtual buffers are discussed below with respect to the illustrative implementations.

The address range that is incremented or offset between subsequent vector processing operations for both the read pointer and the write pointer may advantageously be (but not necessarily be) a fixed or static offset value, which may be identified at compile time when the vector processor instructions are initially generated. The use of a static increment or offset may be particularly useful, as the calculation of the next starting address identified by each subsequent read pointer and write pointer may be determined in a straightforward manner with a priori knowledge of the address range of each buffer and the data rate and without performing additional complex processing tasks. The operation of the vector processing architecture 300 in accordance with a fixed I/O data rate may be leveraged to use of a static address increment between subsequent vector processing operations. In other words, because the buffers 308.1-308.N may retrieve vector data samples from the vector registers 302.1-302.N in accordance with a fixed or static data rate, this may be exploited to simplify the computation of the read and write pointer address offset calculations between subsequent vector processing operations, as the number of vector data samples to be processed each clock cycle may be fixed and thus a predetermined value that is related to the fixed data rate in terms of clock cycles.

The use of the buffers 308.1-308.N enables data access starting at any word and with no overhead. That is, once the vector processing operations have been completed, the results may be read from the buffers 308.1-308.N in an unaligned manner and loaded into the vector registers 302.1-302.N using store operations. This is illustrated in FIG. 4B via the use of the stored data vectors 452, 454 being stored in the buffer 450 across different address ranges.

To adapt to the unaligned manner in which the vector data samples are stored in the buffer 450, the vector processor architecture 300 may include one or more data rotators such as the data rotator logic 456 as shown in FIG. 4B. Although a single data rotator logic 456 is shown in FIG. 4B, this is for purposes of brevity, and the vector processor architecture 300 may include any suitable number of data rotators depending upon the particular application and implementation. The data rotator logic 456 is illustrated as having a specific size, but may be implemented having any suitable size depending upon a particular application. The data rotator logic 456 may be implemented using any suitable hardware components, software components, or combinations thereof. The data rotator logic 456 may be implemented as a Benes network or other suitable component using hardware. The data rotator logic 456 is not shown in FIG. 3 for purposes of brevity, but functions to align the vector data samples that are written to the buffer 450 at the address indicated by a write pointer write_ptr as discussed herein, and read from the buffer 450 in an unaligned manner at starting address locations as indicated by the read pointers read_ptr0 and read_ptr1. The starting address location of the read_pointers read_ptr0 and read_ptr1 may be part of a vector processor instruction and constitute respective read pointers as discussed herein.

FIG. 4B illustrates a scenario in which 2 vectors 452, 454 may be accessed from the buffer 450. The two vectors 452, 454 may be used in two input vector operations such as a vector add or a vector multiply. Again, the starting position of each vector is indicated by read pointers to the starting address position in the buffer 450 as indicated by read_ptr0 and read_ptr1, respectively. Thus, given a vector length of N elements (such as vector data samples), two sets of N sequential elements may be fetched starting from the respective read pointer positions and wrapping to the next consecutive row of the memory as needed. If a starting position of the read pointers point to word zero, then the vector access is aligned to the vector datapath as shown in the aligned access scenario 461 in FIG. 4C. That is, element 0 of a vector is aligned with element 0 of a vector ALU or other suitable vector processor component in the vector datapath. However, if the position of the first element of a vector in the buffer 450 does not point to element 0, then the access is unaligned. This is illustrated in the unaligned scenario 462 in FIG. 4C, in which the first element of the vector is in position 3 of the buffer 450. In such a case, once the vector is read from the buffer 450, element 0 of the vector is in position 3 of the vector ALU, which would result in an incorrect computation. The vector thus needs to be rotated 3 positions as shown in the read result after rotation in the unaligned scenario in FIG. 4C.

Again, this alignment is achieved using the data rotator logic 456 as shown in FIG. 4B, which may include two or more data rotators. In this way, each of the 2 unaligned vectors may be independently rotated by each respective data rotator logic 456 such that each vector becomes aligned to the arithmetic vector datapath. A similar approach may be used to write the resultant vector back to the buffer at any alignment. The following implementations as discussed herein may utilize such data rotation as needed, although this step may not explicitly be noted further herein for purposes of brevity.

Thus, in contrast to the unaligned access from the 4-entry 8 word register file as shown in the unaligned access scenario 462 in FIG. 4C, which requires retrieving all vector data samples from rows 1 and 2, the circular nature of the local buffer 450 enables the execution units 304.1-304.N to read the vector data samples over an address range that includes these vector data samples and no additional vector data samples. This increases efficiency and power savings, as noted herein. The data rotation may be performed at any suitable time to ensure correct computations, and once aligned may then be stored in the vector registers 302.1-302.N. In this way, the data rotator logic 456 re-aligns the vector data samples to ensure compatibility with standardized compilers and instruction sets that access the vector data samples from the vector registers 302.1-302.N in an aligned manner. The data rotator logic 456 may use information regarding the window offset and size of the stored data vectors to shift or realign the bits that are read from the buffer 450 using the read pointer address encoded into the vector processor instruction, and this may occur in a manner that is transparent to the compiler, the decoder 320 or other component generating the vector processor instructions.

With respect to the vector processing operations, these operations may be any suitable type of function that operates on the vector data samples stored in each execution unit 304's respective local buffer 308.1-308.N, which is retrieved by each respective execution unit 304 from one or more of the vector registers 302.1-302.N in accordance with the received vector processor instruction. Such functions may be implemented as part of the particular application in which the vector processing architecture 300 is utilized, which may be digital signal processing operations for wireless communications, such as filter tap contribution calculations, digital pre-distortion (DPD) coefficient or term calculations, average signal measurement calculations over time, digital signal processing of signals transmitted or received via individual antenna data streams for multiple-input-multiple-output (MIMO) antenna systems, etc. Furthermore, the vector data samples as discussed herein may be part of an in-phase (I) quadrature-phase (Q) data stream, which may be processed prior to data transmission of wireless signals or after receiving the wireless signals. Additionally or alternatively, such functions may be implemented as part of graphics processing unit (GPU) to perform graphics processing and/or rendering. Two implementations for the vector processing operations performed by the execution units 304.1-304.N of the vector processor architecture 300 are provided in further detail in each Section below, although these are non-limiting scenarios as the vector processing architecture 300 may be implemented to in accordance with any suitable type of application and implementation, as noted above.

Digital Pre-Distortion (DPD) Vector Processing Operation Implementation

Again, the buffers 308.1-308.N, which may be further partitioned into any suitable number of virtual buffers as described herein, may function in a streaming manner. This means that as each vector processing operation is performed on a set of vector data samples, which may have a size equal to one or more data vectors, the read pointer is incremented or advanced by some address range to create an address offset between vector processing operations. This address range increment or offset may be less than the address range spanned by the entire set of vector data samples (an address range for 64 vector data samples as shown in the illustrated scenario of FIG. 5), resulting in subsequent vector processing operations being performed re-using a portion of vector data samples from subsequent accessed vector data sets. This may be particularly useful to implement sliding window data access for certain types of vector processing operations. One such vector processing operation that leverages this type of sliding window processing includes the calculation of DPD terms or coefficients for a particular data stream. For such calculations, the function performed via the execution of each vector processing operation requires a different address offset within the data stream of retrieved vector data samples to compute a contribution to the output of the DPD term calculations.

Figure 5:
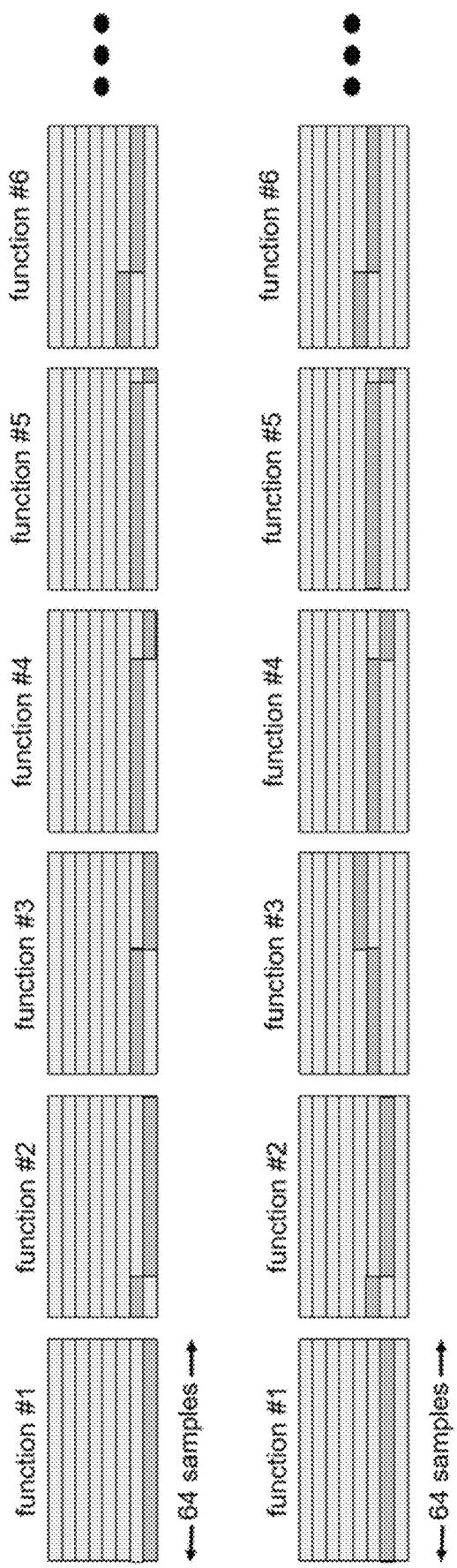
FIG. 5 illustrates the use of a buffer with a vector processor architecture to perform digital pre-distortion (DPD) vector processing operations, in accordance with the disclosure.

That is, and with reference now to FIG. 5, the buffer structure as shown may be identified with a portion of one or more of the buffers 308.1-308.N. In the illustrated scenario as shown in FIG. 5, it is assumed that the vector data samples used to perform each function or each vector processing operation have already been retrieved from one or more of the vector registers 308.1-308.N and loaded into the buffer. Moreover, a vector processing operation is performed each clock cycle on a set of vector data samples having a size of 64 samples. The progression of the functions 1 through 6 as shown in FIG. 5 corresponds to 6 sequentially-executed vector processing operations, one per clock cycle and each performing a respective operation or function on 64 vector data samples stored in the buffer. The top and bottom progressions each illustrate a sequential order of sets of vector data samples being read or accessed from the buffer based upon the starting address location indicated by the vector processor instruction received each clock cycle. The top and bottom progressions show how the sets of vector data samples may follow different patterns sequentially based upon the read pointer indicated by each the vector processor instruction in each consecutive vector processing operation identifying different starting addresses.

In both cases, the starting position of the set of vector data samples read for each vector processing operation is incremented from the previous vector processing operation in accordance with the starting address location within the buffer as indicated by the read pointer. However, the set of data samples accessed between consecutive vector processing operations partially overlap with one another. In other words, consecutive data processing operations re-use a portion of the set of 64 vector data samples. The particular portion of "overlapping" or re-used vector data samples may vary depending upon the particular application and vector processing operations performed. In any event, the various vector processing operations may be performed in this manner until the entire vector data samples stored in the buffer are processed, thereby resulting in the calculation of one or more DPD coefficients in this particular scenario.

In other words, several vector processing operations may be performed over a series of clock cycles, as noted above. Prior to the vector processing operations being performed, the buffer may store any suitable number of vector data samples, such as 512 vector data samples using the illustration as shown in FIG. 5, with each row containing 64 vector data samples and the buffer including 8 rows. The use of the read pointers and buffers 308.1-308.N facilitate the vector processing circuitry 310.1-310.N performing a vector processing operation in response to receiving a corresponding vector processor instruction that is executed during a clock cycle. This vector processing operation is performed using a first portion of the stored set of vector data samples that are read from the buffer (from a starting address as indicated by the read pointer included in the vector processor instruction), and which may be an entire row of vector data samples, i.e. 64 vector data samples associated with a range of addresses for a complete row as shown in the first step in each of the top and bottom scenarios as shown in FIG. 5.

Then, for a subsequent clock cycle, the vector processing circuitry 310.1-310.N performs a vector processing operation in response to receiving another vector processor instruction using a second portion of the stored set of vector data samples that are read from the buffer (from an incremented or offset starting address as indicated by the read pointer included in the next vector processor instruction), and which may correspond to the next vector processing operation as shown in the second step in each of the top and bottom scenarios as shown in FIG. 5, and span a portion of the first row of 64 vector data samples and a portion of the next row of 64 vector data samples. Thus, between subsequent vector processing operations, some of each portion of the stored set of vector data samples are the same as one another, or re-used. In one scenario, this may include a predetermined number of the each portion of the stored set of vector data samples are the same as one another, or re-used, which may be in accordance with the size of the data vectors and the particular application (such as the number of filter taps which may define a number of the vector data samples that are re-used). Thus, the scenario shown in further detail herein in FIGS. 6A-6K may re-use 7 of the 11 vector data samples between consecutive vector processing operations. Advantageously, several vector processing operations may be performed over several clock cycles without the need for the execution units 304.1-304.N to retrieve additional vector data samples from the vector registers 302.1-302.N. Again, this reduces the need to use the interconnection network between clock cycles, freeing up this resource, reducing power, and increasing the speed of computations.

Asymmetric Filter Vector Processing Operation Implementation

As another application scenario, an asymmetric filter, which is a finite impulse response (FIR) filter for illustrative purposes in this implementation, are typically implemented in transceivers as part of digital signal processing operations. FIR filters implement a series of taps assigned to a number of filter coefficients, which are applied to incoming data streams to perform digital filtering. FIR filters are implemented having any suitable number of taps depending upon the particular application or implementation, and which may be related to the operating frequency of the wireless communications and the desired frequency response. The calculations as discussed further herein with respect to FIGS. 6A-6K assume an 8-tap asymmetric filter implementation, although this is for illustrative purposes and not by way of limitation. The vector processor architecture 300 may perform vector processing operations in accordance with any suitable type of filter application or other applications, as noted herein.

The FIR filter output for a particular data stream represents the application of a set of coefficients to each of the filter taps. As discussed in further detail below, this is accomplished by reading, for each vector processing operation, a number of vector data samples from one of the buffers 308.1-308.N over a range of addresses, with the start of the address range as indicated by the read pointer noted above. Each vector processing operation in this scenario functions to multiply the FIR filter coefficients by each one of the vector data samples read from the buffer address range, which are then added together to compute the final contribution of each of the FIR filter taps in accordance with the FIR filter coefficients. As further discussed below with reference to FIGS. 6A-6K, the vector processor architecture 300 may be implemented to perform such calculations by sequentially calculating a partial output of the FIR filter, or the contribution of a subset of the FIR filter taps, to the overall contribution of all FIR filter taps. This process may then be repeated until the output of each of the FIR filter taps for the set of coefficients for that particular filter are calculated, which may then be applied to an incoming data stream to realize the FIR filtering operation.

Figure 6A:
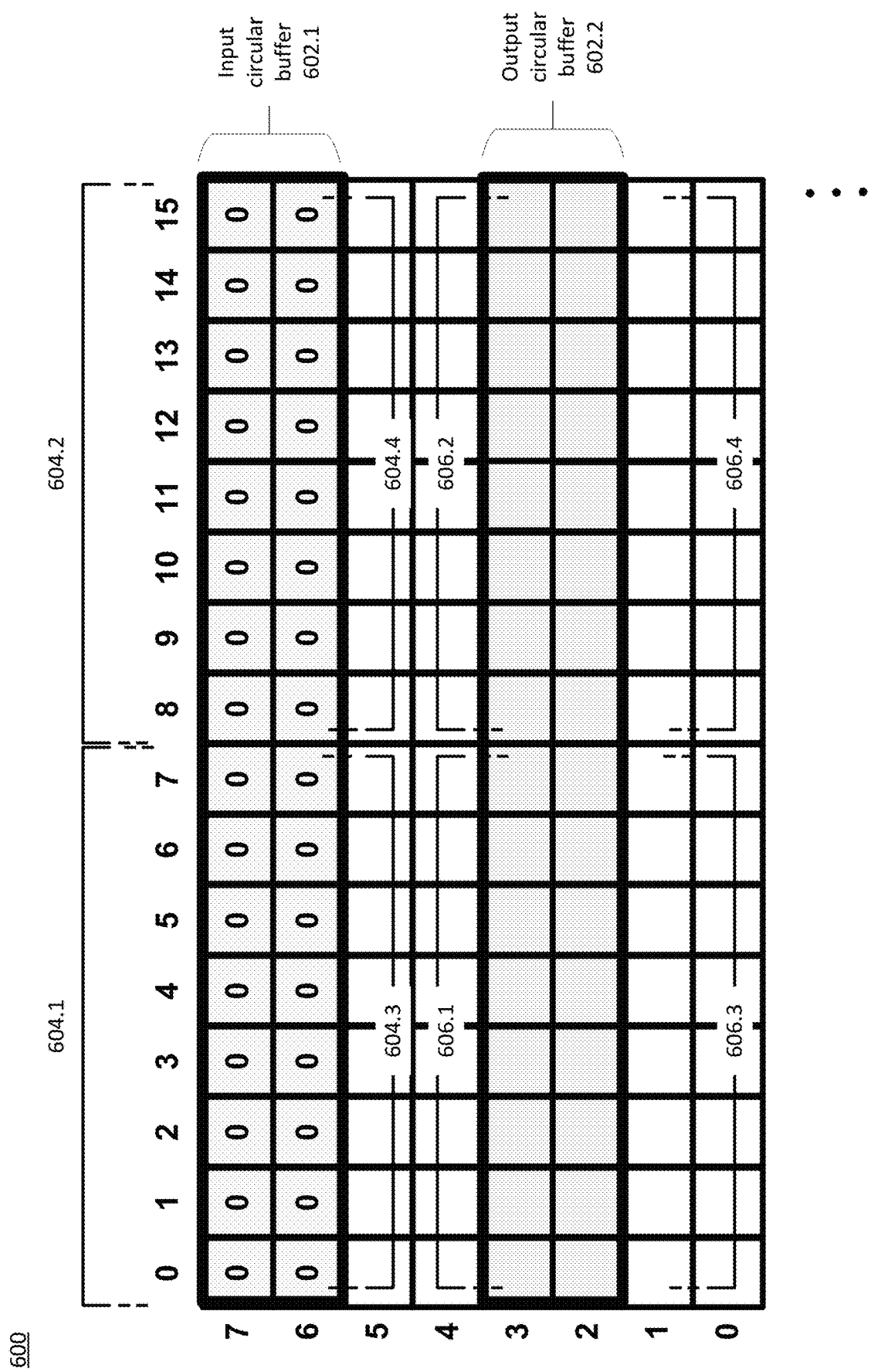

Turning now to FIG. 6A, as noted above, the buffers 308.1-308.N, may be further partitioned into any suitable number of virtual buffers and enable vector processing operations to be performed in a streaming manner to perform sliding time window computations, as noted above with respect to FIG. 5 and the calculation of DPD terms. In the scenario as discussed in further detail with respect to FIGS. 6A-6K, the buffer 600 as shown may be identified with any one of (or each of) the buffers 308.1-308.N as shown in FIG. 3, which is identified with a respective execution unit 304.1-304.N. In this scenario, the buffer 600 has a total addressable range of 8 rows 0-7 and 16 columns 0-15. Each address location of the buffer 600 is represented as an individual box of an intersecting row and column, and may store an individual vector data sample. The buffer 600 is partitioned into two virtual circular buffers, each having a predetermined address range. The buffer 600 includes an input buffer 602.1, which has an address range identified with rows 6-7 and columns 0-15, and is thus configured to store a total of four data vectors 604.1, 604.2, 604.3, 604.4, with each of these data vectors containing 8 vector data samples. The buffer 600 also includes an output buffer 602.2, which has an address range identified with rows 2-3 and columns 0-15, and which has an address range configured to store a total of four data vectors 606.1, 606.2, 606.3, 606.4, with each of these data vectors containing 8 vector data samples.

The data samples represented by one or more data vectors stored in the input buffer 602.1 and the output buffer 602.2 may be referred to herein as a set of vector data samples. The sets of vector data samples stored in the buffer 602.1 as referred to herein may thus be identified with any number of vector data samples of two or more. Thus, a set of vector data samples may be associated with any suitable number of data vectors or, alternatively, a set of vector data samples may be associated with a number of vector data samples contained in less than a single data vector. For ease of explanation and not by way of limitation, the term "set of vector data samples" as used for the FIR filter calculations with reference to FIG. 6A-6K describes a number of vector data samples identified with the number of data vectors retrieved from one or more of the vector registers 302.1-302.N in a single clock cycle. Thus, as used with respect to the non-limiting implementation as shown in FIGS. 6A-6K, a set of vector data samples may include 16 total vector data samples, 8 per data vector, as two data vectors are retrieved from the vector registers 302.1-302.N in one clock cycle in this scenario. Of course, the input buffer 602.1 and the output buffer 602.2 may have any suitable size and accompanying address range, and thus may be configured to store any suitable number and any suitable size of vector data samples and/or otherwise store any suitable number of sets of vector data samples.

Figure 6B:
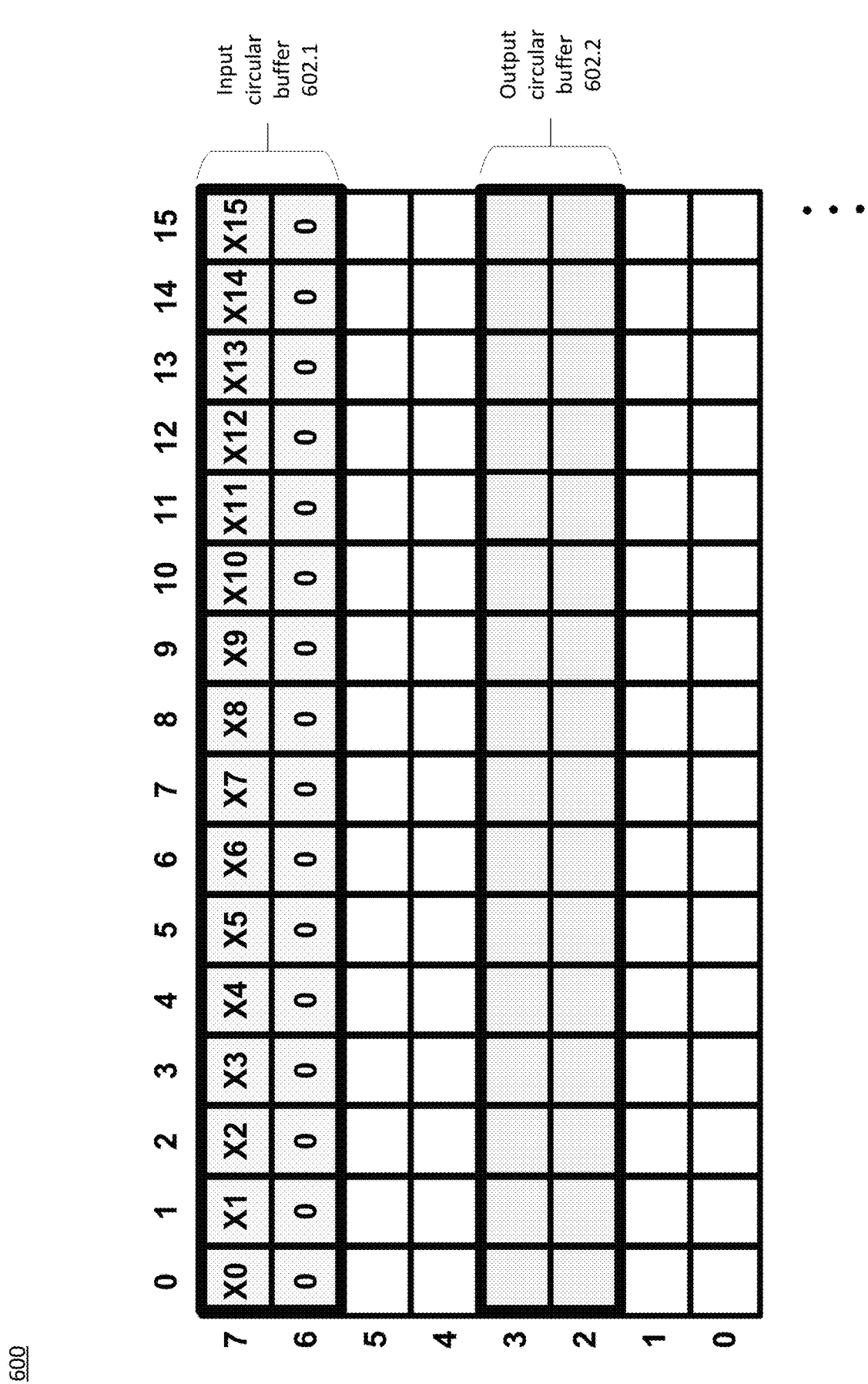

As shown in FIG. 6A, the input buffer 602.1 is assumed to be initialized with zeros. In the next vector processing operation as shown in FIG. 6B, the respective execution unit 304 identified with the buffer 600 retrieves a set of vector data samples from one or more of the vector registers 302.1-302.N and loads (i.e. writes) the vector data samples into the input buffer 602.1 corresponding to the range of address at row 7, which are represented as the set of vector data samples X0-X15. In this illustrative scenario, the set of vector data samples X0-X7 (data vector 604.1) and X8-X15 (data vector 604.2) are written into the input buffer 602.1 during a single clock cycle for a single vector processor instruction, which constitutes the data vectors 604.1, 604.2. Thus, the vector processor instruction for this vector processing operation specifies that the two vectors 604.1, 604.2 containing the set of vector data samples X0-X15 are to retrieved from the vector registers 302.1-302.N and written to the input buffer 602.1 starting at a specific buffer address indicated as row 7, column 0.

Although any suitable number of data vectors may be retrieved and loaded into the input buffer 602.1, this requires additional complexity and bandwidth with respect to the interconnection network, and therefore a suitable compromise such as 2 data vectors may be a typical implementation. Also, it is noted that for this 8-tap asymmetric filter implementation, the number of vector data samples required to compute a single data vector (containing 8 vector data samples in this case) is equal to the number of vector data samples in the data vector (8 in this case), plus the total number of coefficients (8 in this scenario for an 8 tap FIR implementation), minus 1. Thus, 15 total vector data samples are needed to compute a single data vector including 8 vector data samples, and therefore retrieving and writing two data vectors in one vector processing operation is sufficient for this particular implementation.

Figure 6C:
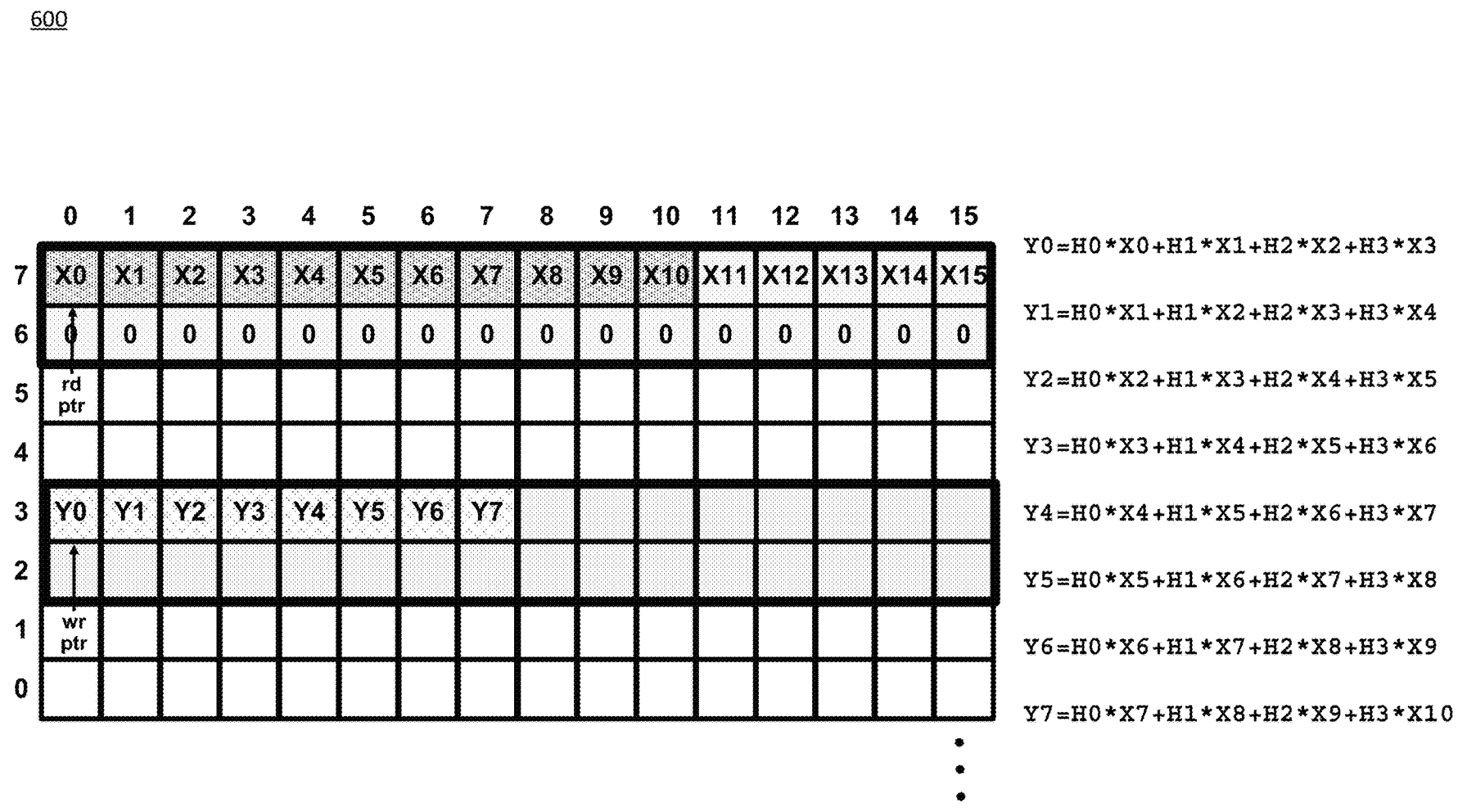

During a subsequent vector processing operation as shown in FIG. 6C, the vector processing operation computes the first 8 outputs of the FIR filter with respect to the contribution of the first 4 taps using the vector data samples X0-X10. The vector processor instruction for this vector processing operation thus contains the starting address as indicated by the read pointer, indicating the address location in the buffer 602.1 from which the vector data samples are to be retrieved, and the total number of vector data samples (11 in this case) to be retrieved to perform the computation as shown on the right side of FIG. 6C. The multipliers H0-H3 are identified with the first four of the 8 FIR filter taps, which are multiplied and added with the vector data samples X0-X10 once retrieved form the input buffer 602.1. Due to the sliding time window processing as noted herein, each computed output Y0-Y7 uses a set of 4 vector data samples X0-X10 retrieved from the input buffer 602.1 but shifted by one with respect to one another. That is, the output Y0 uses the vector data samples X0-X3, the output Y1 uses the vector data samples X1-X4, and so on. The vector processor instruction also includes a starting vector address location in the output buffer 602.2 as indicated by the write pointer and the total number of vector data samples (8 in this case) to be written to the output buffer 602.2 at this location. The computed results Y0-Y7 of performing the vector processing operation on the vector data samples X0-X10 are stored in this range of addresses in the output buffer 602.2 (row 3, columns 0-7).

Figure 6D:
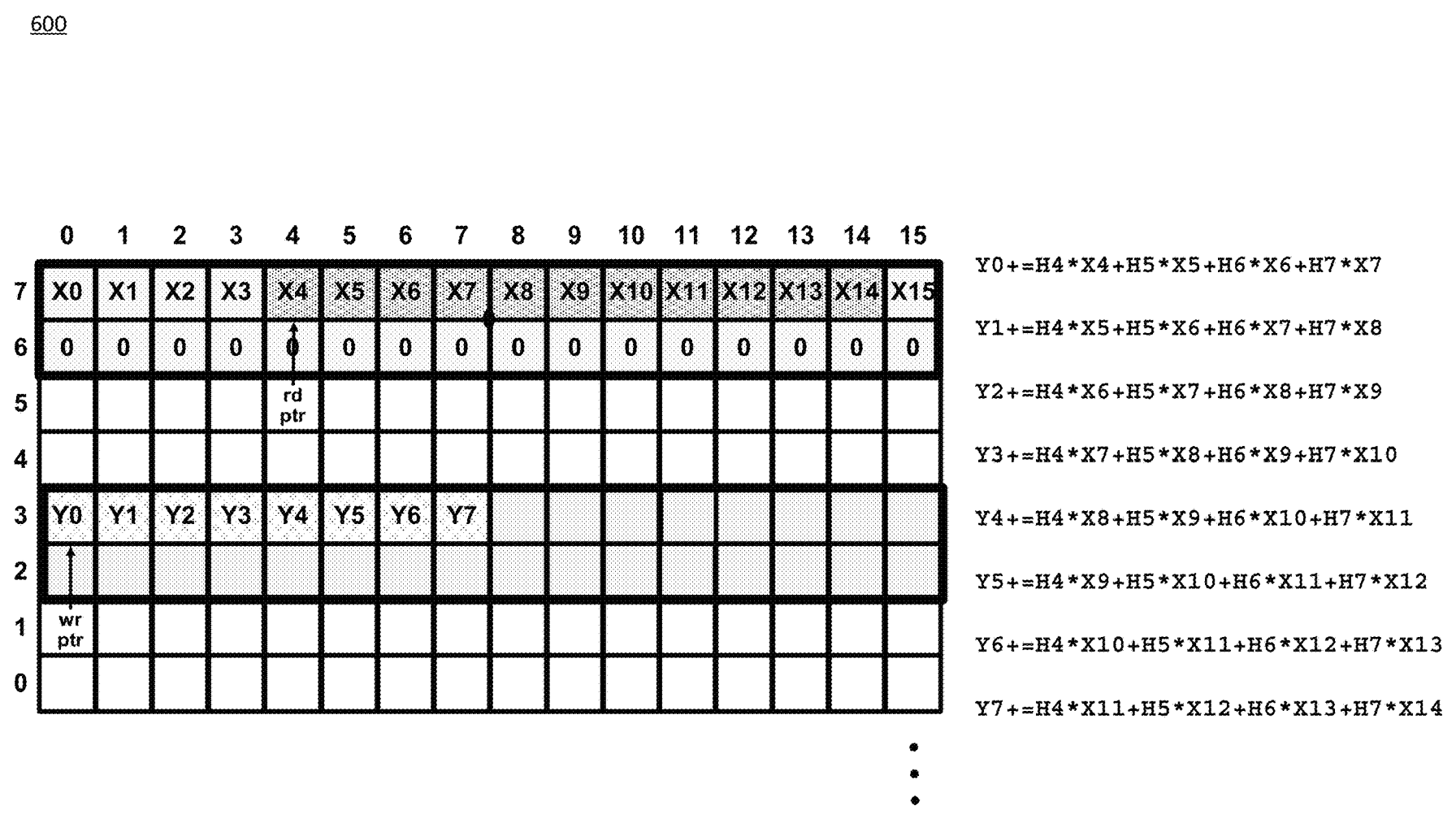

During a subsequent vector processing operation as shown in FIG. 6D, the vector processing operation continues to compute the first 8 outputs of the FIR filter with respect to the contribution of the second 4 taps using the vector data samples X4-X14. The vector processor instruction for this vector processing operation thus contains the starting address as indicated by the read pointer, indicating the address location in the buffer 602.1 from which the vector data samples are to be retrieved (row 7, column 4), and the total number of vector data samples (11 in this case) to be retrieved to perform the computation on the right side of FIG. 6D. The contribution of the first 4 filter taps was already computed and stored as the vector data samples Y0-Y7, and therefore the notation "+=" as shown in FIG. 6D represents the remainder of the calculation for each of the first 8 outputs. This computation uses the filter taps H4-H7, which are identified with the second four of the 8 FIR filter taps, and these are multiplied and added with the vector data samples X4-X14 once retrieved form the input buffer 602.1. Again, due to the sliding time window processing as noted herein, each computed output Y0-Y7 uses a set of 4 vector data samples X4-X14 retrieved from the input buffer 602.1 but shifted by one with respect to one another. Again, the vector processor instruction also includes a starting vector address location in the output buffer 602.2 as indicated by the write pointer and the total number of vector data samples (8 in this case) to be written to the output buffer 602.2 at this location. The computed results Y0-Y7 of performing the vector processing operation on the vector data samples X4-X14 are stored at this range of addresses in the output buffer 602.2 (row 3, columns 0-7).

With reference to FIG. 6D, the vector processing operation performed on the vector data samples X4-X14 results in the partial results Y0-Y7, which may be accumulated with or added to the previous computation as discussed with respect to FIG. 6C. Thus, after the two vector processing operations are performed as shown in FIGS. 6C and 6D, respectively, the contribution of the first 8 outputs of the FIR filter for all 8 taps is computed and represented by the vector data samples Y0-Y7 stored in the output buffer 602.2. In other words, the vector processor instruction used to instruct the relevant execution unit 304.1-304.N to perform the vector processing operation in each of FIGS. 6C and 6D includes loading the vector data samples X0-X15 from the vector registers 302, reading the appropriate vector data samples X0-X15 from the input buffer 602.1, performing the output contribution calculations Y0-Y7, and writing the results of the output contribution calculations to the output buffer 602.2. Thus, two vector processing operations are used in this scenario to calculate a single data vector containing 8 vector data samples. It is noted that although the vector processor instructions for each of the vector processing operations performed in FIGS. 6C and 6D, respectively, result in the starting address location of the read pointer being incremented, the vector processor instructions for each of the vector processing operations may indicate the same write pointer starting address location in the output buffer 602.2. However, and as shown in FIGS. 6E and 6F, the vector processor instruction used to instruct the relevant execution unit 304 to perform the next vector processing operation for the next output of the 8 FIR filter taps may increment the write pointer address location by a number of addresses equal to the size of the vector data samples (8 in this case).

As noted above for the DPD implementation, several vector processing operations may be performed over several clock cycles without the need for the execution units 304.1-304.N to retrieve additional vector data samples from the vector registers 302.1-302.N. This is also true in this implementation, as illustrated in FIGS. 6C and 6D by the vector processing operations being performed by retrieving the vector data samples X0-X14 from the input buffer 302.1 without the need to retrieve this data from the vector registers 302.1-302.N. This may be true for suitable umber of vector processing operations, and advantageously reduces the need to use the interconnection network between clock cycles.

Figure 6E:
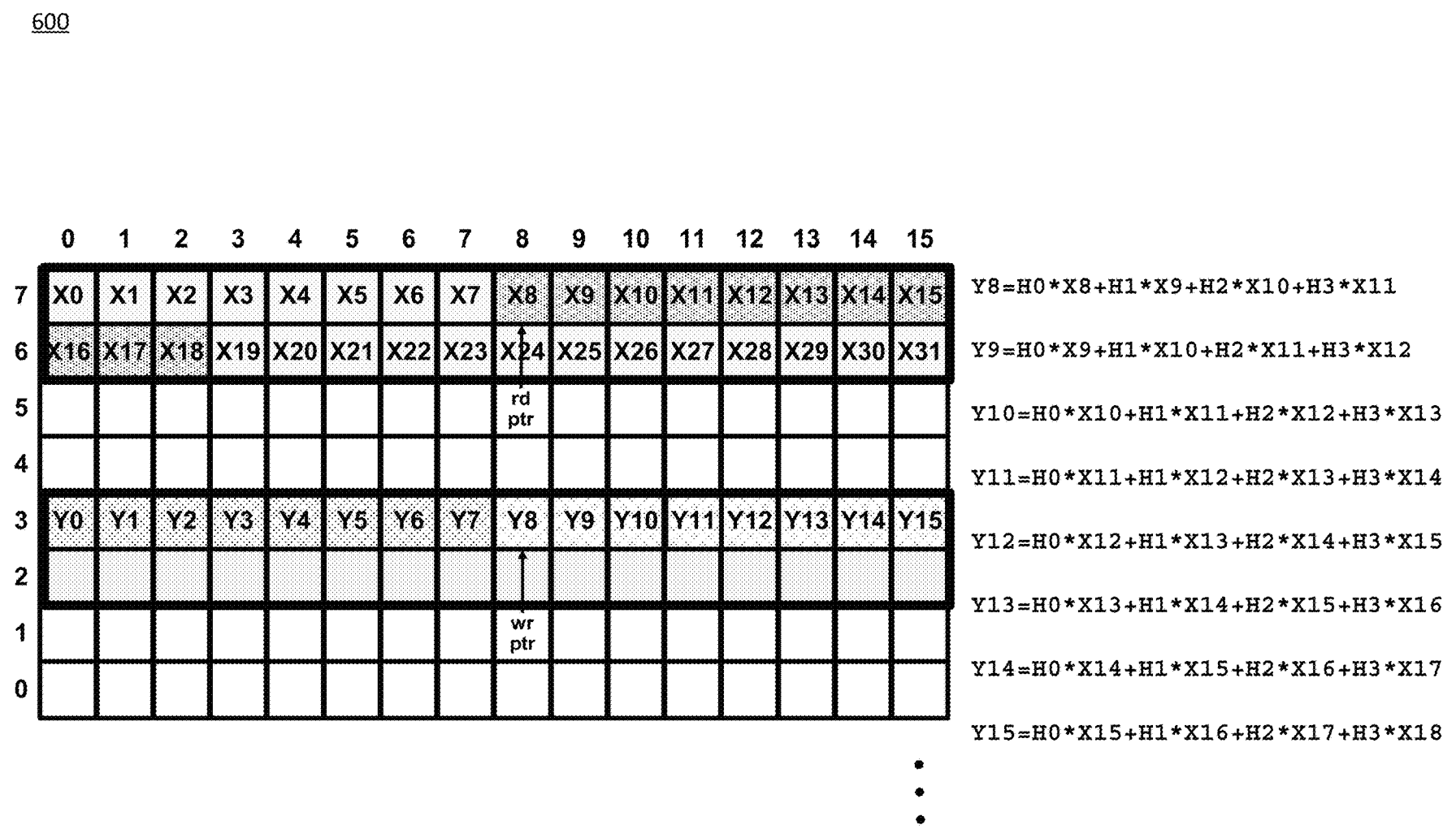
Figure 6F:
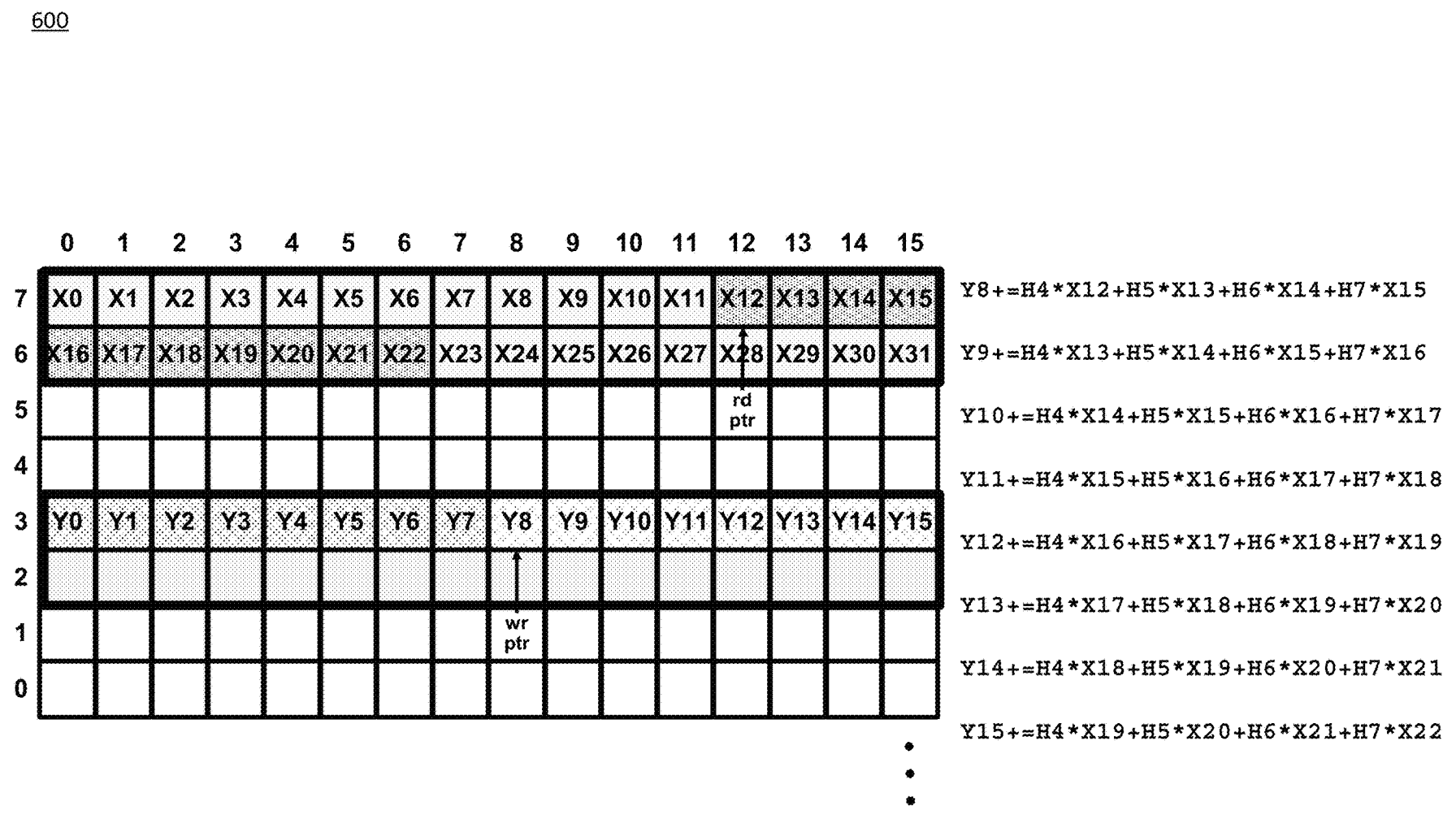

During a subsequent vector processing operation as shown in FIG. 6E, the vector processing operation computes the next (second) 8 outputs of the FIR filter with respect to the contribution of the first 4 taps using the vector data samples X8-X18. To do so, the respective execution unit 304.1-304.N identified with the buffer 600 retrieves another set of vector data samples (two data vectors 604.3, 604.4 in this scenario) from one or more of the vector registers 302.1-302.N and loads (i.e. writes) the vector data samples into the input buffer 602.2 corresponding to the range of address at row 6, which are represented as the set of vector data samples X16-X31. In this illustrative scenario, the set of vector data samples X16-X23 (data vector 604.3) and X24-X31 (data vector 604.4) are written into the input buffer 602.1 during a single clock cycle for a single vector processor instruction, which constitutes the data vectors 604.3, 604.4. Thus, the vector processor instruction for this vector processing operation specifies that the two vectors 604.3, 604.4 containing the set of vector data samples X16-X31 are to be retrieved from the vector registers 302.1-302.N and written to the input buffer 602.1 starting at a specific buffer address indicated as row 6, column 0.

During the subsequent vector processing operation as shown in FIG. 6E, the vector processing operation computes the second 8 outputs of the FIR filter with respect to the contribution of the first 4 taps using the vector data samples X8-X18. The vector processor instruction for this vector processing operation thus contains the starting address as indicated by the read pointer, indicating the address location in the buffer 602.1 from which the vector data samples are to be retrieved (row 7, column 8), and the total number of vector data samples (11 in this case) to be retrieved to perform the computation on the right side of FIG. 6E. Again, the multipliers H0-H3 are identified with the first four of the 8 FIR filter taps, which are multiplied and added with the vector data samples X8-X18 once retrieved form the input buffer 602.1. The vector processor instruction also includes a starting vector address location in the output buffer 602.2 as indicated by the write pointer and the total number of vector data samples (8 in this case) to be written to the output buffer 602.2 at this location. The computed results Y8-Y15 of performing the vector processing operation on the vector data samples X8-X18 are stored at this range of addresses in the output buffer 602.2 (row 3, columns 8-15). Also, as shown in FIG. 6E, the range of the vector data samples X-8-X18 spans between the rows 6 and 7 of the input buffer 602.1.

The vector processor instruction indicates the location of the starting address using the read pointer, and the relevant execution unit 304.1-304.N may utilize the vector processor instructions together with knowledge regarding the range of addresses identified with the buffer 602.1 to retrieve the vector data samples in this manner, i.e. by "wrapping" around the range of vector address from X15 at row 7 to continue to retrieve the remainder of the vector data samples X16-X18 at column 6. This wrapping feature is a function of the buffers 602.1, 602.2 being implemented as circular in nature, and the particular manner in which vector data samples may be distributed across the input buffer 602.1 and the output buffer 602.2 may be in any suitable manner. The address range of each respective buffer thus defines a circular pattern of storage of vector data samples, which are eventually overwritten as new vector data samples are retrieved, as further discussed below. This advantageously enables the size of the input buffer 602.1 and output buffer 602.2 to be particularly small.

The read pointer as indicated by the vector processor instruction points to a vector address location in the input buffer 602.1 that is incremented or offset from the address location of the previous read pointer for the previous vector processing operation (FIG. 6D) by four, which is a result of the vector processing operations being performed for a set of four FIR filter taps at a time. Thus, the offset or increment made to the read pointer between vector processing operations is a function of the particular type of vector processing operation that is performed, and thus may be known to the compiler a priori and used to construct the vector processor instructions.

During a subsequent vector processing operation as shown in FIG. 6F, the vector processing operation continues to compute the second 8 outputs of the FIR filter with respect to the contribution of the second 4 taps using the vector data samples X12-X22. The vector processor instruction for this vector processing operation thus contains the starting address as indicated by the read pointer, indicating the address location in the buffer 602.1 from which the vector data samples are to be retrieved (row 7, column 12), and the total number of vector data samples (11 in this case) to be retrieved to perform the computation on the right side of FIG. 6F. The contribution of the second 4 filter taps uses the filter taps H4-H7, and these are multiplied and added with the vector data samples X12-X22 once retrieved from the input buffer 602.1. Again, the vector processor instruction also includes a starting vector address location in the output buffer 602.2 as indicated by the write pointer and the total number of vector data samples (8 in this case) to be written to the output buffer 602.2 at this location. The computed results Y8-Y15 of performing the vector processing operation on the vector data samples X12-X22 are stored at this range of addresses in the output buffer 602.2 (row 3, columns 8-15). The vector processing operation performed on the vector data samples X12-X22 results in the partial results Y8-Y15, which may be accumulated with or added to the previous computation as discussed with respect to FIG. 6E.

Thus, after two additional vector processing operations are performed as shown in FIGS. 6E and 6F, respectively, the contribution of the second 8 outputs of the FIR filter for all 8 taps is computed and represented by the vector data samples Y8-Y15 stored in the output buffer 602.2.

In other words, the vector processor instruction used to instruct the relevant execution unit 304.1-304.N to perform the vector processing operation in each of FIGS. 6E and 6F includes loading the vector data samples X16-X31 from the vector registers 302, reading the appropriate vector data samples X8-X22 from the input buffer 602.1, performing the output contribution calculations Y8-Y15, and writing the results of the output contribution calculations to the output buffer 602.2 as vector data samples. Thus, two vector processing operations are used in this scenario to calculate a single data vector containing 8 vector data samples.

Figure 6G:
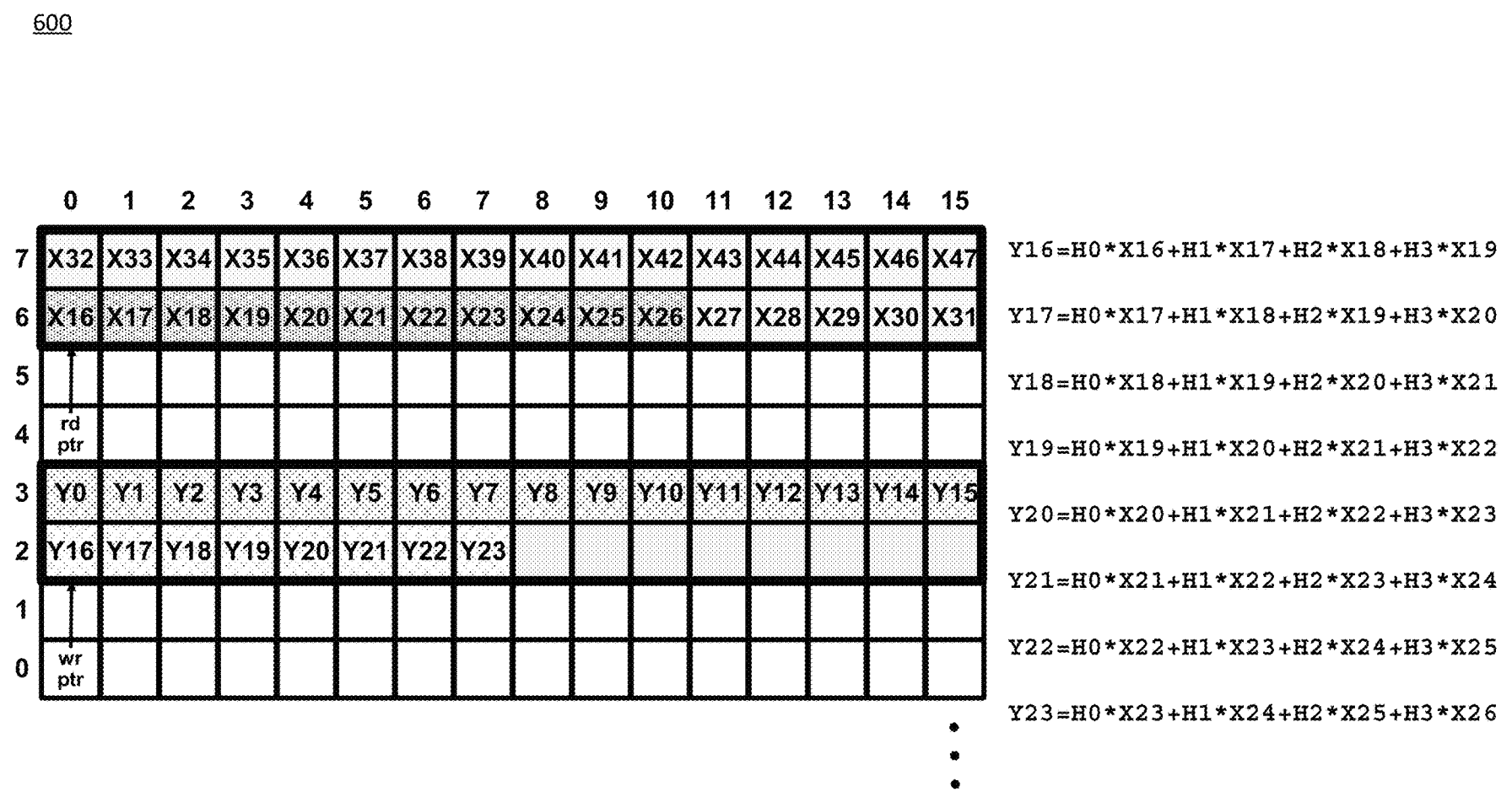
Figure 6H:
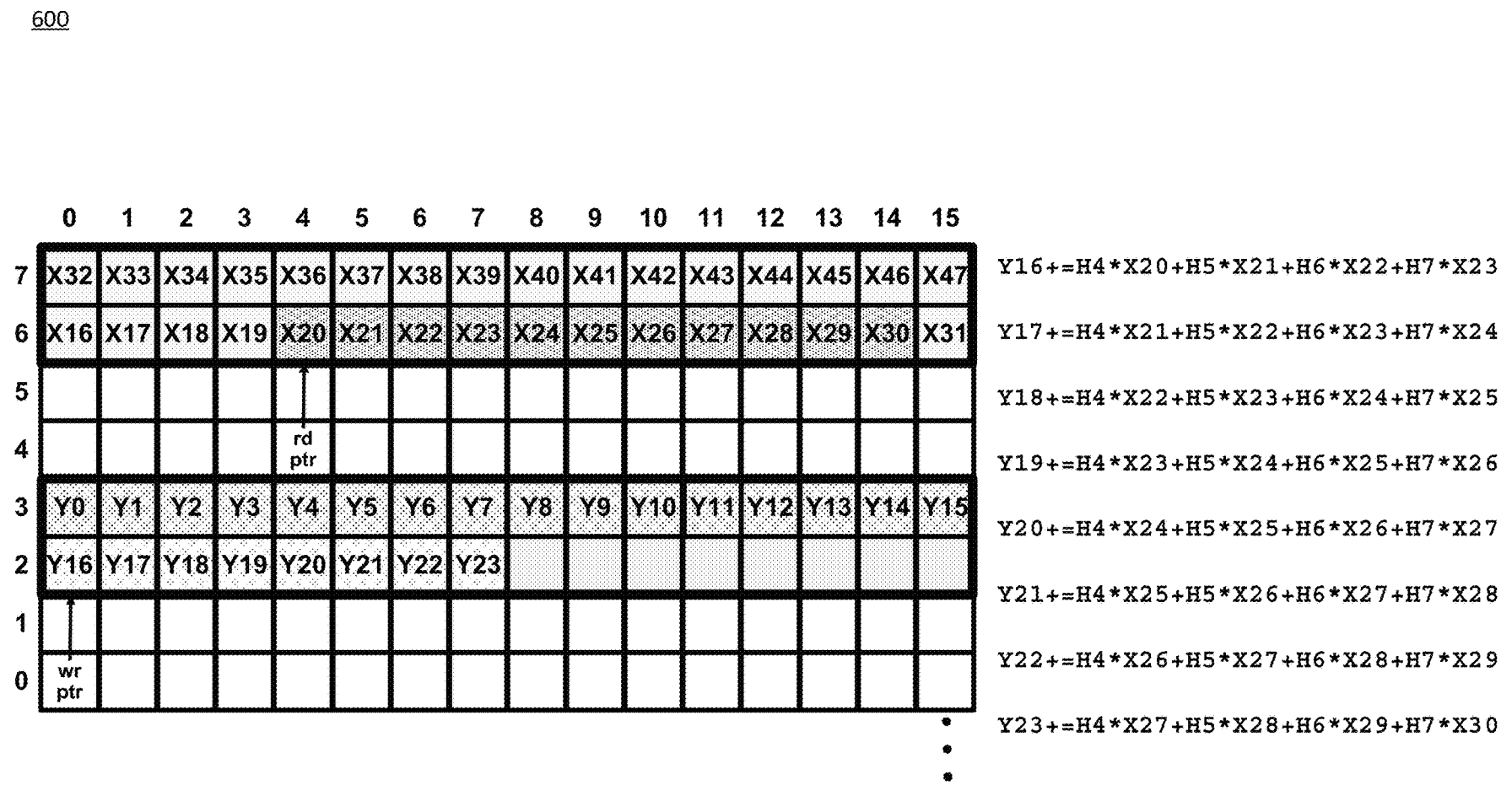

This process of performing vector processing operations on the data read from the input buffer 602.1 and storing the results of the calculations in the output buffer 602.2 may be repeated for any suitable number of vector processing operations, with the read pointer being incremented as indicated by each subsequent vector processor instruction. Turning now to FIGS. 6G and 6H, during two subsequent vector processing operations, the vector processing operations respectively compute the third 8 outputs of the FIR filter with respect to the contribution of the first and second 4 taps using the vector data samples X16-X30. The result of these calculations are then stored in an address range of the output buffer 602.2 identified with the vector data samples Y16-Y23.

Another advantageous use of the input buffer 602.1 and the output buffer 602.2 is overwriting older vector data samples from previous vector processing operations that are no longer needed. This may be triggered by the read pointer address location being advanced to a starting address location in the input buffer 602.1 beyond a predetermined address range. That is, and as shown in FIG. 6G, the read pointer is now advanced to row 6 of the input buffer 602.1. Thus, the entire address range of row 7, which previously contained the vector data samples X0-X15, are no longer needed for subsequent vector processing operations. Therefore, upon completion of the vector processing operation as shown in FIG. 6F, the vector processing operation as shown in FIG. 6G includes the relevant execution units 304.1-304.N retrieving two new data vectors from the vector registers 302.1-3.02.N, the vector data samples of which are loaded into the input buffer 602.1 over a range of addresses associated with row 7 as shown in FIG. 6G. Thus, the contents of this range of addresses in the input buffer 602.1 are overwritten with the new vector data samples X32-X47 for future vector processing operations to be performed on these vector data samples (see FIGS. 6I, 6J, and 6K).

Figure 6I:
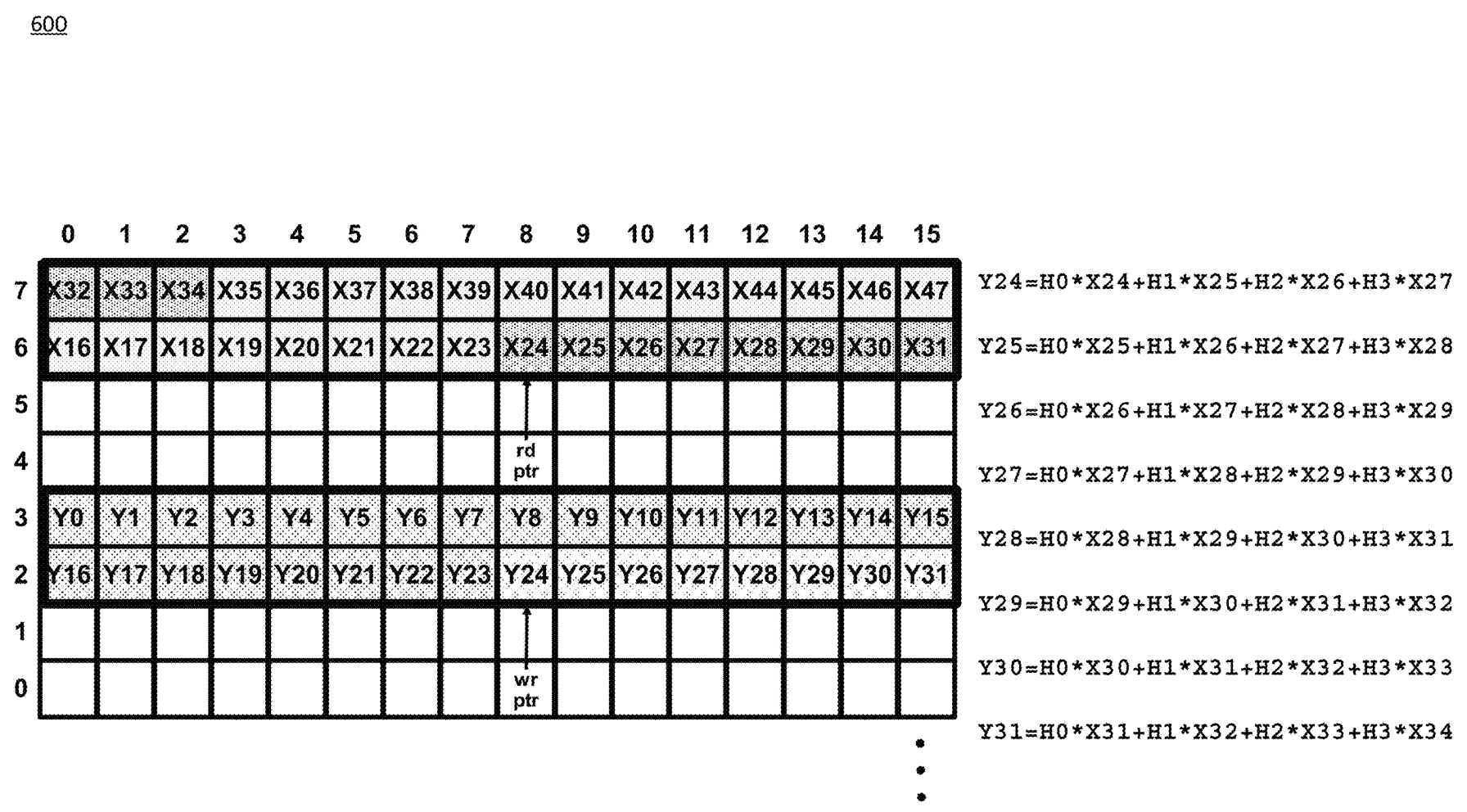
Figure 6J:
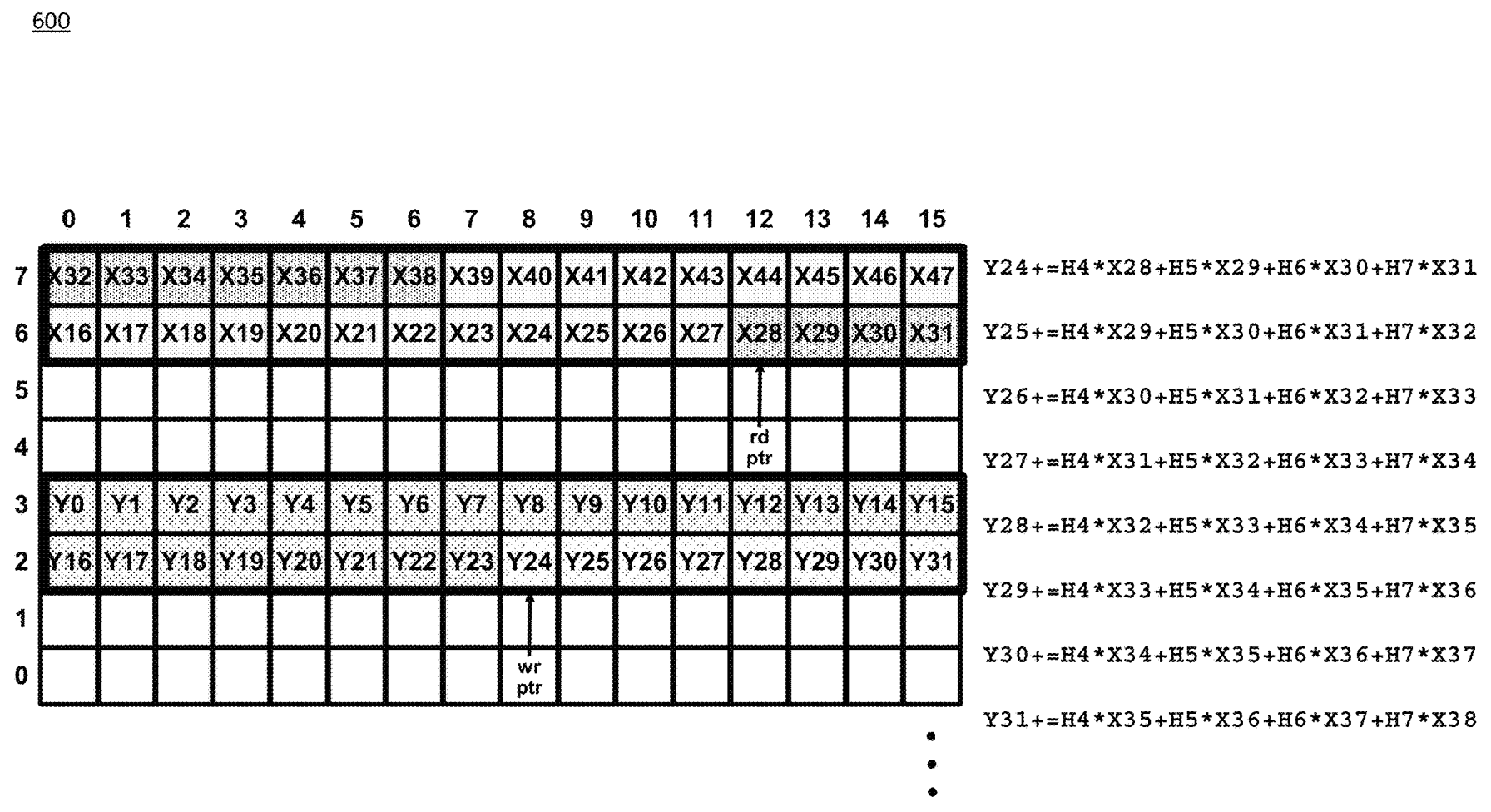

Thus, during two subsequent vector processing operations as shown in FIGS. 6I and 6J, the vector processing operations respectively compute the fourth 8 outputs of the FIR filter with respect to the contribution of the first and second 4 taps using the vector data samples X24-X38, a portion of which (X32-X38) being part of the vector data samples overwritten to the previous vector data samples X0-X15 during the previous vector processing operation (see FIG. 6G). The result of these calculations are then stored in an address range of the output buffer 602.2 identified with the vector data samples Y24-Y32.

The output buffer 602.2 may likewise contain vector data samples that are periodically overwritten as they become irrelevant or unneeded. The results stored as vector data samples after a number of vector processing operations have been performed as shown in FIG. 6J, which are represented as Y0-Y31. The vector processor architecture 300 may transmit these vector data samples to another processor component, such as the vector registers 302.1-302.N, the I/O data, etc., which may be implemented by transferring, via a vector processor instruction, the vector data samples Y0-Y31 to the vector registers 302.1-302.N, which may then be transferred to the vector data memory 301 as shown in FIG. 3. This may be triggered upon completion of one or more previous vector processing operations and/or by the vector processor instruction including a write pointer that has been incremented to point to a starting vector address in the output buffer 601.2 associated with a predetermined range of addresses (such as 8). In any event, it is assumed with respect to FIG. 6K that the previous vector data samples stored in the address range indicated by Y0-Y7 are no longer needed and can be overwritten as subsequent vector processing operations are performed to calculate the new vector data samples Y32-Y40.

Figure 6K:
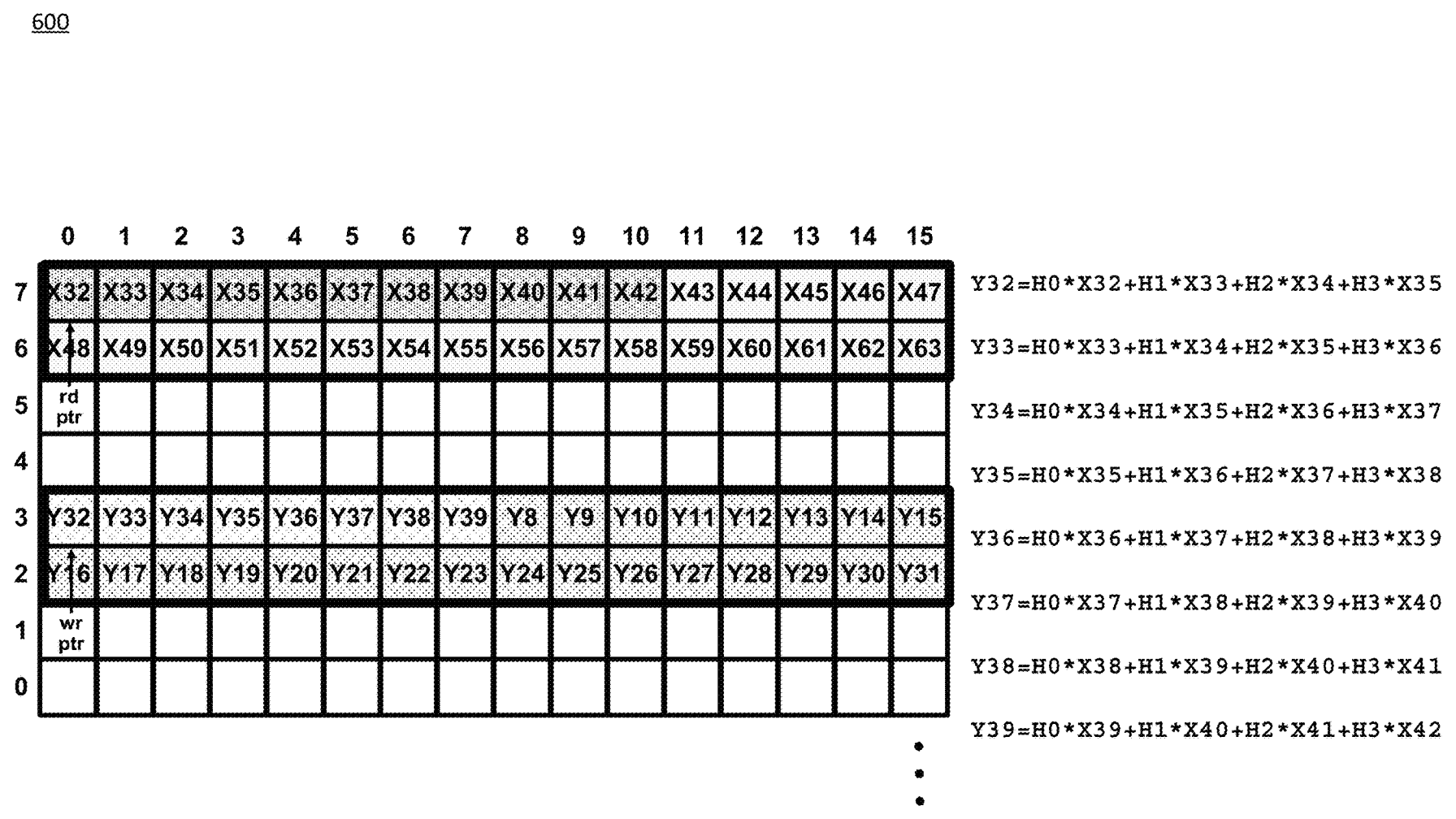

Thus, and as shown in FIG. 6K, the process of performing additional vector processing operations is continued, which may be repeated via the execution of the previous vector processing operations as discussed above with respect to FIGS. 6C-6I. It is noted that the read and write pointers are now back to their original address locations with respect to the input buffer 601.1 and the output buffer 602.2, respectively. This is a result of the advancement of each of the read and write buffers over subsequent vector processing operations, as discussed herein.

Device Implementing Cascaded Processing

Figure 7:
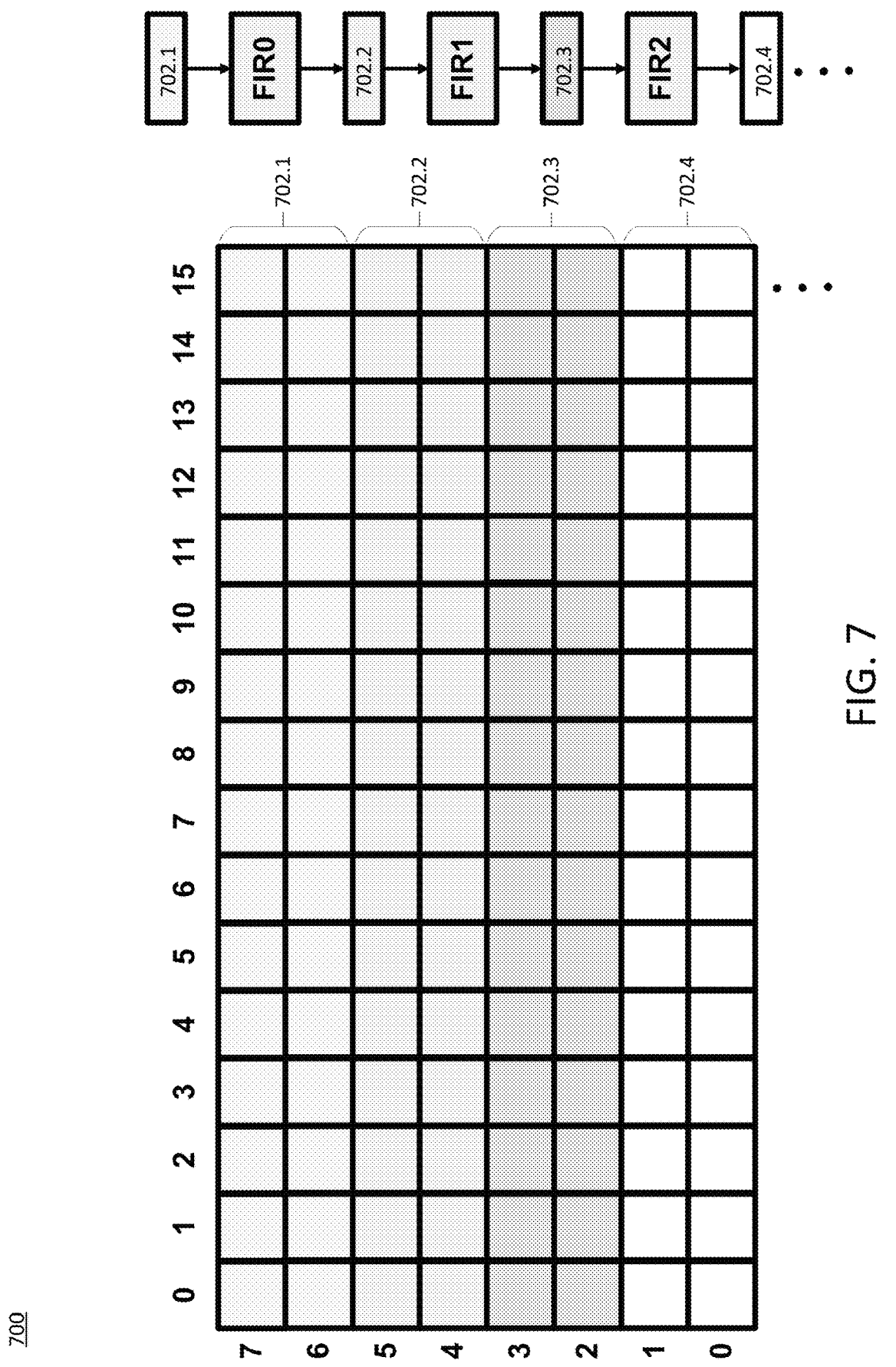
FIG. 7 illustrates the use of several circular buffers with a vector processor architecture to perform cascaded processing, in accordance with the disclosure.

FIG. 7 illustrates the use of several circular buffers with a vector processor architecture to perform cascaded processing, in accordance with the disclosure. Again, the buffers 308.1-308.N as shown and discussed herein with respect to FIG. 3 may be divided or partitioned into any suitable number of virtual buffers, as discussed in further detail herein with respect to FIGS. 6A-6K. This may be particularly advantageous when each buffer is dedicated for a specific type of vector processing function as part of a pipeline of cascaded processing operations. That is, similar to analog filtering, which may be performed in series and in several stages as part of known radio architectures, transceivers implementing digital filtering using DSP operations may do so by sequentially by applying stages of DSP operations on incoming data streams.

Thus, and as shown in FIG. 7, the buffer 700 may be identified with one or more of the buffers 308.1-308.N, and be partitioned into any suitable number of virtual buffers 702.1-702.N based upon the number of processing stages. In the illustration shown in FIG. 7, the buffer 700 includes a total of four virtual buffers 702.1-702.4, which accommodate three different processing stages to calculate the contribution of FIR filter taps to data streams in a sequential manner. Thus, each vector processing stage FIR0, FIR1, and FIR2 may operate in a similar or identical manner as the asymmetric filter vector processing operations as shown and discussed herein with respect to FIGS. 6A-6K. However, the actual calculations, number of taps, and/or filter coefficients may vary among the different FIR processing stages. Of course, the use of the filter processing stages is an illustrative and non-limiting scenario, as the vector processor architecture 300 may be used to perform any suitable type of vector processing operations on the vector data samples in a cascaded manner.

As shown in FIG. 7, each FIR stage FIR0, FIR1, and FIR2 operates on the vector data samples read from the respective buffer 702.1-702.4, which is output from the processing via the previous FIR processing stage. In other words, each of the virtual buffers 702.1-702.4 is a producer and consumer of streaming data, with the buffer 702.1 functioning as the input buffer 602.1 as discussed herein, which retrieves vector data samples from one or more of the vector registers 302.1-302.N that are written into an addressable range of the buffer 702.1. The buffer 702.2 functions as the output buffer 602.2 as discussed herein, which stores the results of the FIR0 processing stage (i.e. the vector processing operations performed on the vector data samples stored in the buffer 702.1). Thus, the buffers 702.2, 702.3, 702.4, etc. function as both the input buffer 602.1 and the output buffer 602.2 as discussed herein. That is, the FIR stage FIR1 retrieves the stored vector data samples from the buffer 702.2 that have been written to an address range of the buffer 702.2 via the FIR stage FIR0 performing the vector processing operations on the vector data samples stored in the buffer 702.1 (which functioned as an output buffer for the FIR stage FIR0), although the buffer 702.2 functions as an input buffer for the FIR stage FIR1 vector processing operations. The FIR stage FIR1 then performs the relevant vector processing operations on the vector data samples stored in the buffer 702.2 (now functioning as an input buffer), performs the relevant vector processing operations on the vector data samples stored in the buffer 702.2, and then stores or writes the results of the vector processing operations associated with the FIR stage FIR1 to the buffer 702.3.

Thus, the vector processing operations may be cascaded or chained sequentially, with subsequent vector processing stages (such as FIR0, FIR1, FIR2, etc.) being applied to the results of the previous vector processing calculations. The data may (but need not necessarily) flow through the functional pipeline of several cascaded vector processing operations in this manner at a fixed rate. Again, the use of a fixed data rate may advantageously allow for the vector processor instructions to be calculated in a less complex manner and/or in a less processor-intensive manner. As an additional advantage of such cascading vector processing architectures, all control may be computable at compile time to render appropriate vector data processor instructions based upon the particular application, the number of stages, the type of vector processing operations performed by each stage, etc.

With respect to the vector processor instructions, these may include any suitable type of machine-readable code, opcode, etc. that may be read by the execution units 304.1-304.N and/or the processor circuitry 310.1-310.N implemented by each of the execution units 304.1-304.N, as discussed herein. The vector processor instructions may identify a number of computations to perform, a number and location (such as a read pointer address location) from which to retrieve vector data samples from the vector data registers 302.1-302.N, a number of vector data samples to retrieve from the vector registers 302.1-302.N, a location from which the vector data samples are stored or written to the buffers 308.1-308.N (such as write pointer address starting locations), a location (such as a read pointer starting address location), the number and/or type of vector processing operations to perform on vector data samples read form the buffers 308.1-308.N, a location (such as a write pointer starting address location) in the buffers 308.1-308.N to write the results of performing the vector processing operations, etc.

In one illustrative scenario, the vector processor instruction may include an instruction to compute an FIR on a stream of vector data samples, such as the vector processing operations as discussed herein with respect to FIGS. 6A-6K. In accordance with such a scenario, and as noted above, each instruction results in a specific execution unit 304.1-304.N reading a partial computation of the filtered data from an accumulator (a subset of taps computed in a previous instruction). The instruction computes the contribution of additional taps and adds the computation to the partially computed sum, with the partial results being written back to the accumulator, and the final results being written into one or more of the buffers 308.1-308.N as the two vector outputs (16 vector data samples) as discussed herein with respect to FIGS. 6A-6K.

Thus, a vector processor instruction may contain any suitable number of operands representing a number of bits that encode a specific instruction in accordance with the particular vector processing operation and implementation. The general syntax for such a vector processor instruction may be represented as follows:

operation (<FU>, A, B, D, E, F, R, S, T);

The vector processor instruction thus functions to instruct a corresponding execution unit 304.1-304.N that receives the vector processor instruction to perform a specific task. Thus, the vector processor instruction may be executed by the processing circuitry 310.1-310.N of a corresponding execution unit 304.1-304.N in accordance with any suitable type of software language, machine code, opcode, etc., which may be a set of predetermined software instructions, a hardware implementation, or combinations of both. The various vector processor instructions may have any suitable format depending upon the particular compiler and language used by the vector processor architecture 300. The instructions illustrated in Table 1 below may form part of the instruction sets stored in the program memory 306, which may be generated by the decoder 320 in accordance with a predetermined type of machine-readable code that is executed by the execution units 304.1-304.N in accordance with a predetermined machine-readable and executable software instruction set. The specific arrangement of bits represented by each operand of the vector processor instruction may cause the execution units 304.1-304.N to execute specific vector processing operations. The first operand of the vector processor instruction may include a control field such as ctrl:, which is indexed to the particular data vector being processed (much as 0, 1, 2, etc.) As one scenario, a vector processor instruction for performing FIR a filtering operation may be expressed as follows:

vec_filter(ctrl0, ctrl1, vec_in0, vec_in1, vec_acc_in, vec_out1, vec_out1, vec_acc_out).

The vector processor architecture as discussed herein may implement any suitable number of vector processor instructions, with a sample or subset of some vector processor instructions being represented in Table 1 below and additional operands and fields shown in Tables 2-4 below. Of course, the vector processor architecture may include alternate, additional, and fewer instructions, fields, operands, etc. depending upon the particular operation being performed and the particular application.

TABLE 1

| Instruction | Description |
| --- | --- |
| ctrl: | Instruction Control |
| vec_in0: | First vector of input samples |
| vec_in1: | Second vector of input samples |
| vec_acc_in: | Input vector of partially accumulated results |
| coef_in: | Subset of filter coefficients used in current stage |
| vec_out0: | First vector of filtered output data |
| vec_out1: | Second vector of filtered output data |
| vec_acc_out: | Output vector of partially accumulated results |
| ctrl0[0:2]: | Streaming buffer write index (write pointer) |
| ctrl0[3]: | streaming buffer write enable |
| ctrl[4:12]: | streaming buffer read 0 index (read pointer for vector 0) |
| ctrl[13:21]: | streaming buffer read 1 index (read pointer for vector 1) |
| ctrl[22:27]: | coefficient buffer read index |
| ctrl[28]: | 0-16-bit data, 1-32-bit data |
| ctrl[28]: | 0-real data, 1-complex data |
| ctrl[30]: | 0-multiply, 1-multiply accumulate |

Again, a vector processor instruction may contain any suitable number of operands, each encoding a specific instruction in accordance with the particular vector processing operation and implementation. Thus, the syntax for an FIR filter vector processor instruction may be represented as follows:

v_fir_filter (<FU>, A, B, D, E, F, R, S, T);
with <FU> being a specific field with respect to the particular compiler used to generate the instruction. Table 2 below summarizes a set of such operands, which are explained in further detail below.

TABLE 2

| Operand | Direction | C Type | Width (bits) | Cycle |
| --- | --- | --- | --- | --- |
| A | Input | unsigned int | 32 | 0 |
| B | Input | unsigned int | 32 | 0 |
| D | Input | _int1024 | 1024 | 0 |
| E | Input | _int1024 | 1024 | 0 |
| F | Input | _int2560 | 2560 | 4 |
| R | Output | _int1024 | 1024 | 6 |
| S | Output | _int1024 | 1024 | 6 |
| T | Output | _int2560 | 2560 | 4 |

Such a vector processing instruction may represent a vector FIR filter operation processor instruction and be utilized by one of the execution units 304.1-304.N to implement various kinds of FIR filters, including non-symmetric, anti-symmetric, symmetric filter, half band interpolation and decimation filter, etc. For symmetric filters, including anti-symmetric filters, symmetry may be exploited to reduce the multiplication number. Thus, for this operation, it is assumed that filter coefficients are pre-arranged and stored in an on-chip lookup table (LUT). The on-chip LUT size may be any suitable size depending upon the particular application, such as 1024×32 bits. The LUT may thus hold up to 2048 16-bit real coefficients in such a case.

The Tables 3 and 4 further include various fields and their accompanying description, which may be implemented to perform filter computations as noted herein or any other suitable type of vector processing operations. Thus, continuing the above scenario, the input vectors D, E may each contain 32 bit vector data samples for a total of 64 consecutive vector data samples. Thus, when enabled, these 64 vector data samples are written into one local buffer 308.1-308.N (SBF) as a word (2048 bit wide), which is addressed by sbf_wr_ptr representing a write pointer as discussed herein. In this scenario, it is assumed that there are 8 such buffer words in the particular local buffer 308.1-308.N. The write into the local buffer 308 is thus word aligned, and therefore sbf_wr_ptr is only 3 bits. The sbf_wr_ptr field may thus represent a write pointer that identifies the starting location in the local buffer 308.1-308.N where data is to be written for further vector processing operations as discussed herein. The sbf_wr_enb field indicates, when enabled, that data is to be written into the local buffer 308.1-308.N (such as from the vector registers 302.1-30.N) as discussed herein. The fields sbf_rd_idx0, sbf_rd_idx1 may respectively represent read pointers identifying the starting location in the local buffer 308.1-308.N from which data is to be read, as discussed herein.

When enabled, the SBF read operation sbf_rd_enb results in an execution unit 304.1-304.N reading out two unaligned buffer words independently from a local buffer 308.1-308.N, which are indexed by sbf_r_idx0, sbf_r_idx1, respectively. These two 2048 bit words may be non-overlapped, partially overlapped, or completely-overlapped, depending on the values of sbf_r_idx0, sbf_r_idx1. To support such unaligned reads, both sbf_r_idx0 and sbf_r_idx1 are allocated 9 bits to be able to read from any 32 bit word position from the local buffer 308.1-308.N. These two read out buffer words are then sent to two sliding window creation (SWC) blocks to go through rotation/interleave-and-rotation and sliding window generation based on the filter types. Each SWC block generates four 32 component vectors, one for each filter coefficient. Usually, one SWC generates 4 vectors for a main data path, whereas the other SWC generates the other 4 vectors for the symmetric data path. Two main path vectors and two symmetric data path vectors are thus sent to a first multiplication block. The other two main path vectors and the other two symmetric data path vectors are sent to a second multiplication block.

Continuing this scenario, one vector is then read out from the on-chip LUT. Four 16 bit real or two 32 bit complex coefficients from the read out vector are cloned into two coefficient vectors. Each coefficient vector is fed to one multiplication block. The products from both multiplication blocks and the accumulation input F are then added together. The results are carried out by T.

Each execution of this operation may produce no filtered data sample (when only SBF write is enabled), 32, or 16 filtered data samples (when SBF read is enabled), depending on the filter type that is being implemented. After all filter coefficients have been applied to one set of data samples, the accumulated results are then processed through a shift-round-saturate (SRS) block to convert to a normal precision format. SRS is a common function in DSP for scaling fixed point data after arithmetic operations that result in data that no longer fits in the vector. Then, the data is packed into a packing register to wait for more samples. After 64 data samples are collected, filtered data sample processing is carried out by R and S. A and B represent pre-generated headers to control each filter operation.

The following dynamic fields are carried by A, B in each v_fir_filter operation:

TABLE 3

| Bit position | Size | Field Name | Definition |
| --- | --- | --- | --- |
| | 1 | sbf_wr_enb | SBF write enable. when set, data carried in D, E is written into SBF. |
| | 1 | sbf_rd_enb | SBF read enable. When set, two SBF words are read out, filter operation is performed. |
| | 1 | symm_enb | When set, symmetric path is enabled. |
| | 9 | sbf_rd_idx0 | SBF read index 0 (read pointer for vector 0) |
| | 9 | sbf_rd_idx1 | SBF read index 1 (read pointe for vector 1) |
| | 1 | pkr_enb | When set, on-chip packing Register enabled. |
| | 1 | pkr_we | When set and pkr_enb = 1, one packing register is written. |
| | 1 | pkr_idx | Packing register Index. May increase to 2 bits. |
| | 1 | pkr_pos | Packing register position to indicate first 16 or second 16 position. May increase to 2 bits if 4-to-1 reduction is needed. |
| | 2 | mac_type | 0-No accumulation 1-Add accumulation input 2-subtract accumulation input 3-un-supported |
| | 3 | sbf_wr_ptr | SBF write index (write pointer) |
| | 1 | mem_w_enb | When set, data will be written into VMEM |
| | 5 | output_fmt | Specify the output format operation |

The following fields are also used per-filter type, which may be loaded when no filter operation is performed (such as when sbf_wr_enb=1 and sbf_rd_enb=0).

TABLE 4

| Bit position | Size | Field Name | Definition |
| --- | --- | --- | --- |
| | 4 | fir_type | FIR filter types |
| | 5 | shift | scalar shift value for SRS |
| | 1 | sym_type | 0-symmetric 1-anti-symmetric |
| | 2 | mul_type | 0-MUL REAL, real numbers multiplication 1-MUL CPX, complex numbers multiplication 2-MUL SEMI, a real number times a complex number 3-MUL MAGS, complex number magnitude square |
| | 1 | mul_size | 0-16 bit mode 1-32 bit mode |
| | 1 | red_mode | 0-No reduction 1-2-to-1 reduction may need to increase to 2 bits |
| | 4 | coef_Lut_idx | Filter coefficient LUT index |
| | 5 | coef_idx | Filter coefficient component start index |

Thus, the vector processing operations as discussed herein may be implemented using a for loop or other suitable control such that vector processing operations are iteratively executed, with the various fields for the vector processor instructions begin changed each pass through the for loop. Such fields thus dictate when data is to be written into the local buffers 308.1-308.N by each respective execution unit 304.1-304.N (sbf_wr_enb), the location within the local buffers 308.1-308.N where the data is to be written (sbf_wr_ptr), when data is to be read from the local buffers 308.1-308.N by each respective execution unit 304.1-304.N (sbf_rd_enb), the location within the local buffers 308.1-308.N from which the data is to be read (sbf_rd_idx0, sbf_rd_idx1, etc.), when data is to be written to the vector registers 302.1-302.N (mem_w_enb), etc.

Device Implementing a Vector Processor Architecture

Figure 8:
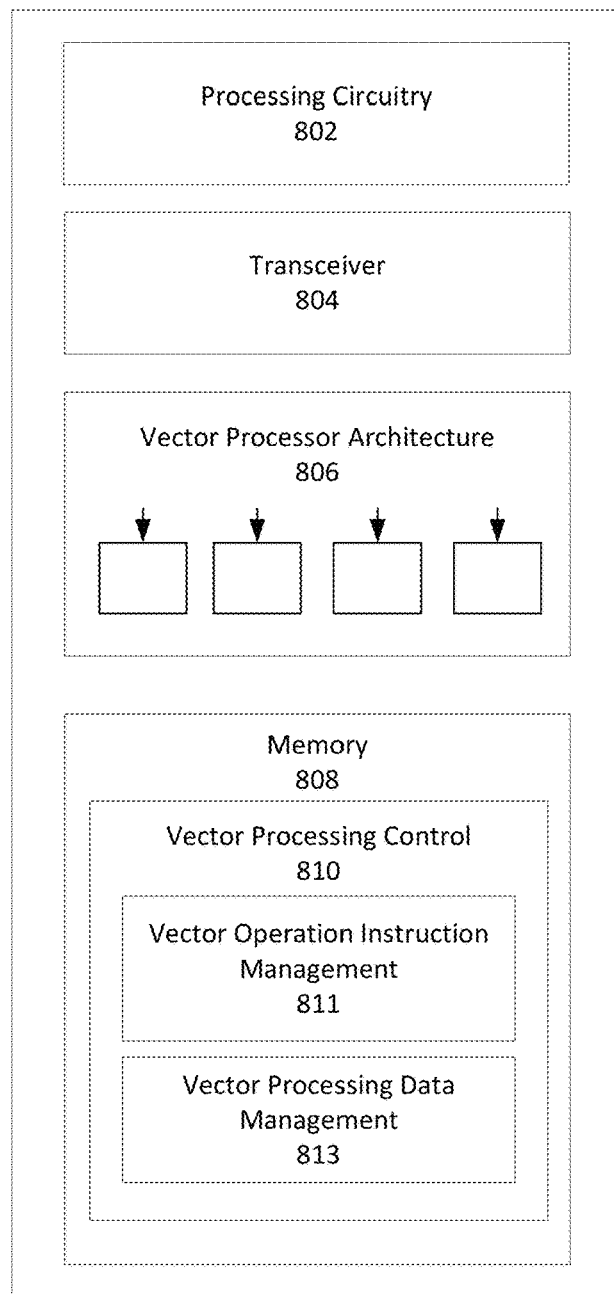
FIG. 8 illustrates an example device, in accordance with the disclosure.

FIG. 8 illustrates an example device, in accordance with the disclosure. The device 800 may be identified with one or more devices implementing a vector processor architecture to perform vector processing operations, such as the vector processor architecture 300 as shown and discussed herein with reference to FIG. 3. The device 800 may be identified with a user equipment (UE) or other suitable device configured to perform wireless communications such as a mobile phone, a laptop computer, a cellular base station, a tablet, etc., which may include one or more components configured to transmit and receive radio signals, to perform digital signal processing, filter processing, DFE processing, etc. Alternatively, the device 800 may be identified with a graphics processing unit (GPU), which may perform graphic processing on streams of graphical data.

As further discussed below, the device 800 may perform the functions as discussed herein with respect to the vector processor architecture 300 as shown and discussed with respect to FIG. 3. The device 800 may perform vector processing operations using locally-implemented or embedded buffers to store vector data samples and the output of performing vector data processing on the stored vector data samples. To do so, the device 800 may include processing circuitry 802, a transceiver 804, a vector processor architecture 806, and a memory 808. The components shown in FIG. 8 are provided for ease of explanation, and the device 800 may implement additional, less, or alternative components as those shown in FIG. 8. In one scenario, the transceiver 804 may be omitted when the device 800 is implemented as a GPU.

The processing circuitry 802 may be configured as any suitable number and/or type of computer processors, which may function to control the device 800 and/or other components of the device 800. The processing circuitry 802 may be identified with one or more processors (or suitable portions thereof) implemented by the device 800. The processing circuitry 802 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 802 may be configured to carry out instructions to perform arithmetical, logical, and/or input/output (I/O) operations, and/or to control the operation of one or more components of device 800 to perform various functions associated with the various techniques as described herein. The processing circuitry 802 may include one or more microprocessor cores, memory registers, buffers, clocks, etc., and may generate electronic control signals associated with the components of the device 800 to control and/or modify the operation of these components. The processing circuitry 802 may communicate with and/or control functions associated with the transceiver 804, the vector processor architecture 806, and/or the memory 808.

The transceiver 804 (when present) may be implemented as any suitable number and/or type of components configured to transmit and/or receive data packets and/or wireless signals in accordance with any suitable number and/or type of communication protocols. The transceiver 804 may include any suitable type of components to facilitate this functionality, including components associated with known transceiver, transmitter, and/or receiver operation, configurations, and implementations. Although depicted in FIG. 8 as a transceiver, the transceiver 804 may include any suitable number of transmitters, receivers, or combinations of these that may be integrated into a single transceiver or as multiple transceivers or transceiver modules. The transceiver 804 may include components typically identified with an RF front end and include antennas, ports, power amplifiers (PAs), RF filters, mixers, local oscillators (LOs), low noise amplifiers (LNAs), upconverters, downconverters, channel tuners, etc. Thus, the transceiver 804 may be configured as any suitable number and/or type of components configured to facilitate receiving and/or transmitting data and/or signals in accordance with one or more communication protocols. The transceiver 804 may be implemented as any suitable number and/or type of components to support wireless communications such as analog-to-digital converters (ADCs), digital to analog converters, intermediate frequency (IF) amplifiers and/or filters, modulators, demodulators, baseband processors, etc. The data received via the transceiver 804 (e.g. wireless signal data streams), data provided to the transceiver 804 for transmission (e.g. data streams for transmission), and/or data used in conjunction with the transmission and/or reception of data via the transceiver 804 (e.g. digital filter coefficients) may be processed as data streams via the vector processor architecture 806, as discussed herein. Thus, the vector processor architecture 806 may be identified with the vector processor architecture 300 as shown and described herein with reference to FIG. 3.

The memory 808 stores data and/or instructions such that, when the instructions are executed by the processing circuitry 802, cause the device 800 to perform various functions as described herein with respect to the vector processor architecture 806, such as controlling, monitoring, and/or regulating the flow of data through the vector processor architecture 806. The memory 808 may be implemented as any well-known volatile and/or non-volatile memory, including read-only memory (ROM), random access memory (RAM), flash memory, a magnetic storage media, an optical disc, erasable programmable read only memory (EPROM), programmable read only memory (PROM), etc. The memory 808 may be non-removable, removable, or a combination of both. The memory 808 may be implemented as a non-transitory computer readable medium storing one or more executable instructions such as, for example, logic, algorithms, code, etc.

As further discussed below, the instructions, logic, code, etc., stored in the memory 808 are represented by the various modules as shown, which may enable the functionally disclosed herein to be functionally enabled. Alternatively, the modules as shown in FIG. 8 that are associated with the memory 808 may include instructions and/or code to facilitate control and/or monitor the operation of hardware components implemented via the device 800. In other words, the modules shown in FIG. 8 are provided for ease of explanation regarding the functional association between hardware and software components. Thus, the processing circuitry 802 may execute the instructions stored in these respective modules in conjunction with one or more hardware components to perform the various functions as discussed herein.

The vector processing control engine 810 may represent the functionality described herein as discussed with reference to controlling and/or monitoring the vector processor architecture 806. The vector processing control engine 810 may represent the program memory 306 (and stored instruction sets), the decoder 320, and/or the vector data memory 301 as discussed herein with reference to FIG. 3. Additionally or alternatively, one or more of the program memory 306, the decoder 320, and/or the vector data memory 301 may form part of the processing circuitry 802, the memory 808, or separate components not shown in FIG. 8.

The executable instructions stored in the vector operation instruction management module 811 may facilitate, in conjunction with execution via the processing circuitry 802, the device 800 providing data streams and vector processor instructions to the vector processor architecture 806 (e.g. from a suitable data source as discussed herein). This may include a determination of a specific vector processor instruction to perform specific types of vector processing operations and/or any of the functionality as discussed herein with respect to the vector processor architecture 300 such as the calculation and storage of vector processing operation results. This may also include retrieving vector data samples from the vector registers 302.1-302.N.

The executable instructions stored in the vector processing data management module 813 may facilitate, in conjunction with execution via the processing circuitry 802, the determination of when the calculated results of vector processing operations are completed and stored in the appropriate buffer 308.1-308.N of an execution unit 304.1-304.N. This may include writing the results in one or more vector registers 304.1-304.N and/or sending the vector data sample results to the vector data memory 301 and/or the I/O data to be utilized by the appropriate components of the device 800 or other suitable device.

General Operation of a Vector Processor Architecture

A vector processing unit is provided. With reference to FIG. 3, the vector processing unit includes a buffer configured to store a set of vector data samples that are retrieved from one or more vector registers; and vector processing circuitry configured to: for a first vector processor instruction that is executed during a first one of a plurality of clock cycles, perform a first vector processing operation using a first portion of the stored set of vector data samples, for a second vector processor instruction that is executed during a second one of the plurality of clock cycles, perform a second vector processing operation using a second portion of the stored set of vector data samples, wherein a predetermined number of the first portion of the stored set of vector data samples used to perform the first vector processing operation are the same as the second portion of the stored set of vector data samples used to perform the second vector processing operation. The first vector processor instruction and the second vector processor instruction each includes a read pointer indicating a respective starting address location of the buffer from which the first portion of the stored set of vector data samples and the second portion of the stored set of vector data samples are read, respectively, to perform each respective first and second vector processing operation. In addition or in alternative to and in any combination with the optional features previously explained in this paragraph, the first vector processor instruction includes a first read pointer indicating a first starting address location of the buffer from which the first portion of the stored set of vector data samples are read, and the second vector processor instruction includes a second read pointer indicating a second starting address location of the buffer from which the second portion of the stored set of vector data samples are read, and the first starting address location and the second starting address location of the buffer are offset from one another by an address range that is less than an address range spanned by the set of vector data samples. In addition or in alternative to and in any combination with the optional features previously explained in this paragraph, the buffer comprises an input buffer and an output buffer, and the set of vector data samples retrieved from the one or more vector registers are stored in the input buffer, and results of the vector processing circuitry performing the first and the second vector processing operation on the first portion of the stored set of vector data samples and the second portion of the stored set of vector data samples, respectively, are stored in the output buffer. In addition or in alternative to and in any combination with the optional features previously explained in this paragraph, the first vector processor instruction and the second vector processor instruction each includes a write pointer indicating a respective starting address location in the output buffer in which the results of the vector processing circuitry performing the first and the second vector processing operation on the first portion of the stored set of vector data samples and the second portion of the stored set of vector data samples, respectively, are stored. In addition or in alternative to and in any combination with the optional features previously explained in this paragraph, the write pointer associated with the first vector processor instruction and the second vector processor instruction indicates the same starting address location in the output buffer. In addition or in alternative to and in any combination with the optional features previously explained in this paragraph, the vector processor circuitry is configured to perform the first vector processing operation and the second vector processing operation without retrieving additional vector data samples from the one or more vector registers. In addition or in alternative to and in any combination with the optional features previously explained in this paragraph, the buffer comprises a further output buffer, the vector processing circuitry is configured to perform the first vector processing operation and the second vector processing operation as part of a plurality of vector processing operations associated with cascaded vector processing operation such that the vector processing circuitry is configured to, for a third vector processor instruction that is executed during a third one of a plurality of clock cycles, perform a third vector processing operation using one or more of a set of vector data samples that are read from the output buffer, with the results of the vector processing circuitry performing the third vector processing operation being stored in the further output buffer. In addition or in alternative to and in any combination with the optional features previously explained in this paragraph, the set of vector data samples are stored in the buffer over an address range, the buffer is configured, upon completion of the second vector processing operation, to overwrite the set of vector data samples stored in the address range with a further set of vector samples retrieved from the one or more vector registers, and the vector processing circuitry is configured to perform, for a third vector processor instruction that is executed during a third one of the plurality of clock cycles, a third vector processing operation by reading a portion of the further set of vector data samples stored in the buffer over the address range. In addition or in alternative to and in any combination with the optional features previously explained in this paragraph, the first vector processing operation and the second vector processing operation each perform digital signal processing operations for wireless communications.

A system on a chip (SoC) is provided. With reference to FIG. 3, the SoC includes a plurality of vector registers; and a plurality of vector processing units, each one of the plurality of vector processing unit comprising: a buffer configured to store a set of vector data samples that are retrieved from one or more of the plurality of vector registers; and vector processing circuitry configured to: for a first vector processor instruction that is executed during a first one of a plurality of clock cycles, perform a first vector processing operation using a first portion of the stored set of vector data samples, and for a second vector processor instruction that is executed during a second one of the plurality of clock cycles, perform a second vector processing operation using a second portion of the stored set of vector data samples, wherein a predetermined number of the first portion of the stored set of vector data samples used to perform the first vector processing operation are the same as the second portion of the stored set of vector data samples used to perform the second vector processing operation. The first vector processor instruction and the second vector processor instruction each includes a read pointer indicating a respective starting address location of the buffer from which the first portion of the stored set of vector data samples and the second portion of the stored set of vector data samples are read, respectively, to perform each respective first and second vector processing operation. In addition or in alternative to and in any combination with the optional features previously explained in this paragraph, the first vector processor instruction includes a first read pointer indicating a first starting address location of the buffer from which the first portion of the stored set of vector data samples are read, and the second vector processor instruction includes a second read pointer indicating a second starting address location of the buffer from which the second portion of the stored set of vector data samples are read, and the first starting address location and the second starting address location of the buffer are offset from one another by an address range that is less than an address range spanned by the set of vector data samples. In addition or in alternative to and in any combination with the optional features previously explained in this paragraph, the buffer comprises an input buffer and an output buffer, and the set of vector data samples retrieved from the one or more vector registers are stored in the input buffer, and results of the vector processing circuitry performing the first and the second vector processing operation on the first portion of the stored set of vector data samples and the second portion of the stored set of vector data samples, respectively, are stored in the output buffer. In addition or in alternative to and in any combination with the optional features previously explained in this paragraph, the first vector processor instruction and the second vector processor instruction each includes a write pointer indicating a respective starting address location in the output buffer in which the results of the vector processing circuitry performing the first and the second vector processing operation on the first portion of the stored set of vector data samples and the second portion of the stored set of vector data samples, respectively, are stored. In addition or in alternative to and in any combination with the optional features previously explained in this paragraph, the write pointer associated with the first vector processor instruction and the second vector processor instruction indicates the same starting address location in the output buffer. In addition or in alternative to and in any combination with the optional features previously explained in this paragraph, the vector processor circuitry is configured to perform the first vector processing operation and the second vector processing operation without retrieving additional vector data samples from the one or more vector registers. In addition or in alternative to and in any combination with the optional features previously explained in this paragraph, the buffer comprises a further output buffer, the vector processing circuitry is configured to perform the first vector processing operation and the second vector processing operation as part of a plurality of vector processing operations associated with a cascaded vector processing operation such that the vector processing circuitry is configured to, for a third vector processor instruction that is executed during a third one of a plurality of clock cycles, perform a third vector processing operation using one or more of a set of vector data samples that are read from the output buffer, with the results of the vector processing circuitry performing the third vector processing operation being stored in the further output buffer. In addition or in alternative to and in any combination with the optional features previously explained in this paragraph, the set of vector data samples are stored in the buffer over an address range, the buffer is configured, upon completion of the second vector processing operation, to overwrite the set of vector data samples stored in the address range with a further set of vector samples retrieved from the one or more vector registers, and the vector processing circuitry is configured to perform, for a third vector processor instruction that is executed during a third one of the plurality of clock cycles, a third vector processing operation by reading a portion of the further set of vector data samples stored in the buffer over the address range. In addition or in alternative to and in any combination with the optional features previously explained in this paragraph, the first vector processing operation and the second vector processing operation each perform digital signal processing operations for wireless communications.

Process Flow

Figure 9:
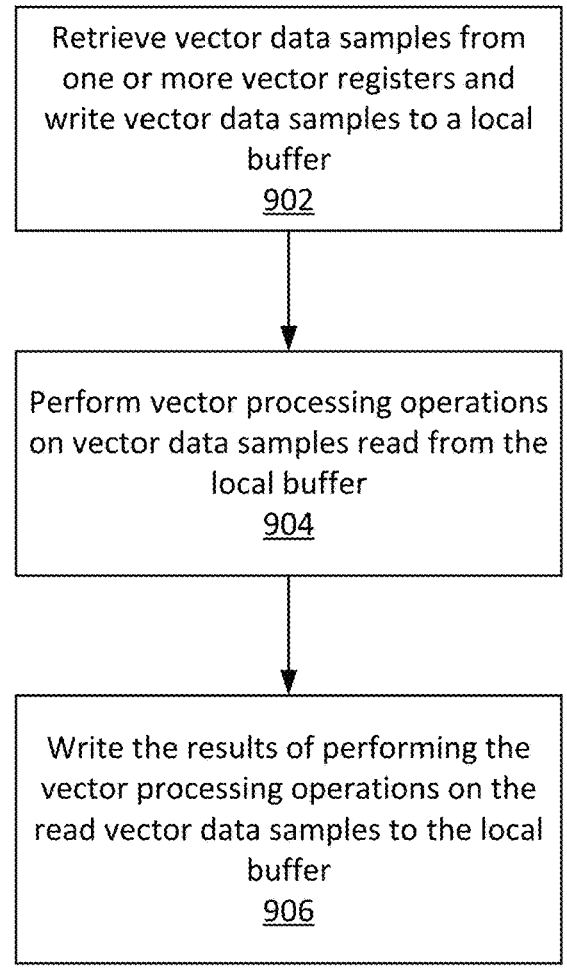
FIG. 9 illustrates a process flow, in accordance with the disclosure.

FIG. 9 illustrates a process flow. With reference to FIG. 9, the flow 900 may be a computer-implemented method executed by and/or otherwise associated with one or more processors (processing circuitry) and/or storage devices. These processors and/or storage devices may be associated with one or more components of the vector processor architecture 300 as discussed herein and/or one or more components of the device 800 as discussed herein. The processors and/or storage devices may be identified with the one or more execution units 304.1-304.N and/or processor circuitry 310.1-310.N executing vector processor instructions. The flow 900 may include alternate or additional steps that are not shown in FIG. 9 for purposes of brevity, and may be performed in a different order than the steps shown in FIG. 9.

Flow 900 may begin when one or more processors retrieve (block 902) vector data samples from one or more of the vector registers 302.1-302.N and write (block 902) the retrieved vector data samples to a local buffer (such as one of buffers 308.1-308.N) associated with an execution unit 304.1-304.N.

Flow 900 may include one or more processors performing (block 904) vector processing operations on vector data samples read from a local buffer. This may include the use of a vector processor instruction that indicates a read pointer identifying the starting address location in the buffer from which the vector data samples are to be read.

Flow 900 may include one or more processors writing (block 906) the results of performing the vector processing operations on the read vector data samples to the buffer. This may include the use of a vector processor instruction that indicates a write pointer identifying the starting address location in the buffer to write the results of performing the vector processing operation. Again, any suitable number of vector processing operations may be performed via the use of subsequent vector processor instructions, as discussed with respect to FIGS. 6A-6K, such that vector processing operations may be executed on a data stream using the circular buffer architecture as discussed herein.

EXAMPLES

The following examples pertain to various techniques of the present disclosure.

An example (e.g. example 1) relates to a vector processing unit. The vector processing unit includes a buffer configured to store a set of vector data samples that are retrieved from one or more vector registers; and vector processing circuitry configured to: for a first vector processor instruction that is executed during a first one of a plurality of clock cycles, perform a first vector processing operation using a first portion of the stored set of vector data samples, for a second vector processor instruction that is executed during a second one of the plurality of clock cycles, perform a second vector processing operation using a second portion of the stored set of vector data samples, wherein a predetermined number of the first portion of the stored set of vector data samples used to perform the first vector processing operation are the same as the second portion of the stored set of vector data samples used to perform the second vector processing operation.

Another example (e.g. example 2) relates to a previously-described example (e.g. example 1), wherein the first vector processor instruction and the second vector processor instruction each includes a read pointer indicating a respective starting address location of the buffer from which the first portion of the stored set of vector data samples and the second portion of the stored set of vector data samples are read, respectively, to perform each respective first and second vector processing operation.

Another example (e.g. example 3) relates to a previously-described example (e.g. one or more of examples 1-2), wherein: the first vector processor instruction includes a first read pointer indicating a first starting address location of the buffer from which the first portion of the stored set of vector data samples are read, and the second vector processor instruction includes a second read pointer indicating a second starting address location of the buffer from which the second portion of the stored set of vector data samples are read, and the first starting address location and the second starting address location of the buffer are offset from one another by an address range that is less than an address range spanned by the set of vector data samples.

Another example (e.g. example 4) relates to a previously-described example (e.g. one or more of examples 1-3), wherein: the buffer comprises an input buffer and an output buffer, and the set of vector data samples retrieved from the one or more vector registers are stored in the input buffer, and results of the vector processing circuitry performing the first and the second vector processing operation on the first portion of the stored set of vector data samples and the second portion of the stored set of vector data samples, respectively, are stored in the output buffer.

Another example (e.g. example 5) relates to a previously-described example (e.g. one or more of examples 1-4), wherein the first vector processor instruction and the second vector processor instruction each includes a write pointer indicating a respective starting address location in the output buffer in which the results of the vector processing circuitry performing the first and the second vector processing operation on the first portion of the stored set of vector data samples and the second portion of the stored set of vector data samples, respectively, are stored.

Another example (e.g. example 6) relates to a previously-described example (e.g. one or more of examples 1-5), wherein the write pointer associated with the first vector processor instruction and the second vector processor instruction indicates the same starting address location in the output buffer.

Another example (e.g. example 7) relates to a previously-described example (e.g. one or more of examples 1-6), wherein the vector processor circuitry is configured to perform the first vector processing operation and the second vector processing operation without retrieving additional vector data samples from the one or more vector registers.

Another example (e.g. example 8) relates to a previously-described example (e.g. one or more of examples 1-7), wherein: the buffer comprises a further output buffer, the vector processing circuitry is configured to perform the first vector processing operation and the second vector processing operation as part of a plurality of vector processing operations associated with cascaded vector processing operation such that the vector processing circuitry is configured to, for a third vector processor instruction that is executed during a third one of a plurality of clock cycles, perform a third vector processing operation using one or more of a set of vector data samples that are read from the output buffer, with the results of the vector processing circuitry performing the third vector processing operation being stored in the further output buffer.

Another example (e.g. example 9) relates to a previously-described example (e.g. one or more of examples 1-8), wherein: the set of vector data samples are stored in the buffer over an address range, the buffer is configured, upon completion of the second vector processing operation, to overwrite the set of vector data samples stored in the address range with a further set of vector samples retrieved from the one or more vector registers, and the vector processing circuitry is configured to perform, for a third vector processor instruction that is executed during a third one of the plurality of clock cycles, a third vector processing operation by reading a portion of the further set of vector data samples stored in the buffer over the address range.

Another example (e.g. example 10) relates to a previously-described example (e.g. one or more of examples 1-9), wherein the first vector processing operation and the second vector processing operation each perform digital signal processing operations for wireless communications.

An example (e.g. example 11) relates to a system on a chip (SoC). The SoC includes a plurality of vector registers; and a plurality of vector processing units, each one of the plurality of vector processing unit comprising: a buffer configured to store a set of vector data samples that are retrieved from one or more of the plurality of vector registers; and vector processing circuitry configured to: for a first vector processor instruction that is executed during a first one of a plurality of clock cycles, perform a first vector processing operation using a first portion of the stored set of vector data samples, and for a second vector processor instruction that is executed during a second one of the plurality of clock cycles, perform a second vector processing operation using a second portion of the stored set of vector data samples, wherein a predetermined number of the first portion of the stored set of vector data samples used to perform the first vector processing operation are the same as the second portion of the stored set of vector data samples used to perform the second vector processing operation.

Another example (e.g. example 12) relates to a previously-described example (e.g. example 11), wherein the first vector processor instruction and the second vector processor instruction each includes a read pointer indicating a respective starting address location of the buffer from which the first portion of the stored set of vector data samples and the second portion of the stored set of vector data samples are read, respectively, to perform each respective first and second vector processing operation.

Another example (e.g. example 13) relates to a previously-described example (e.g. one or more of examples 11-12), wherein: the first vector processor instruction includes a first read pointer indicating a first starting address location of the buffer from which the first portion of the stored set of vector data samples are read, and the second vector processor instruction includes a second read pointer indicating a second starting address location of the buffer from which the second portion of the stored set of vector data samples are read, and the first starting address location and the second starting address location of the buffer are offset from one another by an address range that is less than an address range spanned by the set of vector data samples.

Another example (e.g. example 14) relates to a previously-described example (e.g. one or more of examples 11-13), wherein: the buffer comprises an input buffer and an output buffer, and the set of vector data samples retrieved from the one or more vector registers are stored in the input buffer, and results of the vector processing circuitry performing the first and the second vector processing operation on the first portion of the stored set of vector data samples and the second portion of the stored set of vector data samples, respectively, are stored in the output buffer.

Another example (e.g. example 15) relates to a previously-described example (e.g. one or more of examples 11-14), wherein the first vector processor instruction and the second vector processor instruction each includes a write pointer indicating a respective starting address location in the output buffer in which the results of the vector processing circuitry performing the first and the second vector processing operation on the first portion of the stored set of vector data samples and the second portion of the stored set of vector data samples, respectively, are stored.

Another example (e.g. example 16) relates to a previously-described example (e.g. one or more of examples 11-15), wherein the write pointer associated with the first vector processor instruction and the second vector processor instruction indicates the same starting address location in the output buffer.

Another example (e.g. example 17) relates to a previously-described example (e.g. one or more of examples 11-16), wherein the vector processor circuitry is configured to perform the first vector processing operation and the second vector processing operation without retrieving additional vector data samples from the one or more vector registers.

Another example (e.g. example 18) relates to a previously-described example (e.g. one or more of examples 11-17), wherein: the buffer comprises a further output buffer, the vector processing circuitry is configured to perform the first vector processing operation and the second vector processing operation as part of a plurality of vector processing operations associated with cascaded vector processing operation such that the vector processing circuitry is configured to, for a third vector processor instruction that is executed during a third one of a plurality of clock cycles, perform a third vector processing operation using one or more of a set of vector data samples that are read from the output buffer, with the results of the vector processing circuitry performing the third vector processing operation being stored in the further output buffer.

Another example (e.g. example 19) relates to a previously-described example (e.g. one or more of examples 11-18), wherein: the set of vector data samples are stored in the buffer over an address range, the buffer is configured, upon completion of the second vector processing operation, to overwrite the set of vector data samples stored in the address range with a further set of vector samples retrieved from the one or more vector registers, and the vector processing circuitry is configured to perform, for a third vector processor instruction that is executed during a third one of the plurality of clock cycles, a third vector processing operation by reading a portion of the further set of vector data samples stored in the buffer over the address range.

Another example (e.g. example 20) relates to a previously-described example (e.g. one or more of examples 11-19), wherein the first vector processing operation and the second vector processing operation each perform digital signal processing operations for wireless communications.

An example (e.g. example 21) relates to a vector processing unit. The vector processing unit includes a buffer means for storing a set of vector data samples that are retrieved from one or more vector register means; and vector processing means for: for a first vector processor instruction that is executed during a first one of a plurality of clock cycles, perform a first vector processing operation using a first portion of the stored set of vector data samples, for a second vector processor instruction that is executed during a second one of the plurality of clock cycles, perform a second vector processing operation using a second portion of the stored set of vector data samples, wherein a predetermined number of the first portion of the stored set of vector data samples used to perform the first vector processing operation are the same as the second portion of the stored set of vector data samples used to perform the second vector processing operation.

Another example (e.g. example 22) relates to a previously-described example (e.g. example 21), wherein the first vector processor instruction and the second vector processor instruction each includes a read pointer indicating a respective starting address location of the buffer from which the first portion of the stored set of vector data samples and the second portion of the stored set of vector data samples are read, respectively, to perform each respective first and second vector processing operation.

Another example (e.g. example 23) relates to a previously-described example (e.g. one or more of examples 21-22), wherein: the first vector processor instruction includes a first read pointer indicating a first starting address location of the buffer means from which the first portion of the stored set of vector data samples are read, and the second vector processor instruction includes a second read pointer indicating a second starting address location of the buffer means from which the second portion of the stored set of vector data samples are read, and the first starting address location and the second starting address location of the buffer means are offset from one another by an address range that is less than an address range spanned by the set of vector data samples.

Another example (e.g. example 24) relates to a previously-described example (e.g. one or more of examples 21-23), wherein: the buffer means comprises an input buffer and an output buffer, and the set of vector data samples retrieved from the one or more vector register means are stored in the input buffer, and results of the vector processing circuitry performing the first and the second vector processing operation on the first portion of the stored set of vector data samples and the second portion of the stored set of vector data samples, respectively, are stored in the output buffer.

Another example (e.g. example 25) relates to a previously-described example (e.g. one or more of examples 21-24), wherein the first vector processor instruction and the second vector processor instruction each includes a write pointer indicating a respective starting address location in the output buffer in which the results of the vector processing means performing the first and the second vector processing operation on the first portion of the stored set of vector data samples and the second portion of the stored set of vector data samples, respectively, are stored.

Another example (e.g. example 26) relates to a previously-described example (e.g. one or more of examples 21-25), wherein the write pointer associated with the first vector processor instruction and the second vector processor instruction indicates the same starting address location in the output buffer.

Another example (e.g. example 27) relates to a previously-described example (e.g. one or more of examples 21-26), wherein the vector processor register performs the first vector processing operation and the second vector processing operation without retrieving additional vector data samples from the one or more vector register means.

Another example (e.g. example 28) relates to a previously-described example (e.g. one or more of examples 21-27), wherein: the buffer means comprises a further output buffer, the vector processing means performs the first vector processing operation and the second vector processing operation as part of a plurality of vector processing operations associated with cascaded vector processing operation such that the vector processing circuitry is configured to, for a third vector processor instruction that is executed during a third one of a plurality of clock cycles, perform a third vector processing operation using one or more of a set of vector data samples that are read from the output buffer, with the results of the vector processing means performing the third vector processing operation being stored in the further output buffer.

Another example (e.g. example 29) relates to a previously-described example (e.g. one or more of examples 21-28), wherein: the set of vector data samples are stored in the buffer means over an address range, the buffer means, upon completion of the second vector processing operation, overwrites the set of vector data samples stored in the address range with a further set of vector samples retrieved from the one or more vector registers, and the vector processing means performs, for a third vector processor instruction that is executed during a third one of the plurality of clock cycles, a third vector processing operation by reading a portion of the further set of vector data samples stored in the buffer means over the address range.

Another example (e.g. example 30) relates to a previously-described example (e.g. one or more of examples 21-29), wherein the first vector processing operation and the second vector processing operation each perform digital signal processing operations for wireless communications.

An example (e.g. example 31) relates to a system on a chip (SoC). The SoC includes a plurality of vector register means; and a plurality of vector processing units, each one of the plurality of vector processing unit comprising: a buffer means for storing a set of vector data samples that are retrieved from one or more of the plurality of vector register means; and vector processing means for: for a first vector processor instruction that is executed during a first one of a plurality of clock cycles, perform a first vector processing operation using a first portion of the stored set of vector data samples, and for a second vector processor instruction that is executed during a second one of the plurality of clock cycles, perform a second vector processing operation using a second portion of the stored set of vector data samples, wherein a predetermined number of the first portion of the stored set of vector data samples used to perform the first vector processing operation are the same as the second portion of the stored set of vector data samples used to perform the second vector processing operation.

Another example (e.g. example 32) relates to a previously-described example (e.g. example 31), wherein the first vector processor instruction and the second vector processor instruction each includes a read pointer indicating a respective starting address location of the buffer means from which the first portion of the stored set of vector data samples and the second portion of the stored set of vector data samples are read, respectively, to perform each respective first and second vector processing operation.

Another example (e.g. example 33) relates to a previously-described example (e.g. one or more of examples 31-32), wherein: the first vector processor instruction includes a first read pointer indicating a first starting address location of the buffer means from which the first portion of the stored set of vector data samples are read, and the second vector processor instruction includes a second read pointer indicating a second starting address location of the buffer means from which the second portion of the stored set of vector data samples are read, and the first starting address location and the second starting address location of the buffer means are offset from one another by an address range that is less than an address range spanned by the set of vector data samples.

Another example (e.g. example 34) relates to a previously-described example (e.g. one or more of examples 31-33), wherein: the buffer means comprises an input buffer and an output buffer, and the set of vector data samples retrieved from the one or more vector register means are stored in the input buffer, and results of the vector processing means performing the first and the second vector processing operation on the first portion of the stored set of vector data samples and the second portion of the stored set of vector data samples, respectively, are stored in the output buffer.

Another example (e.g. example 35) relates to a previously-described example (e.g. one or more of examples 31-34), wherein the first vector processor instruction and the second vector processor instruction each includes a write pointer indicating a respective starting address location in the output buffer in which the results of the vector processing means performing the first and the second vector processing operation on the first portion of the stored set of vector data samples and the second portion of the stored set of vector data samples, respectively, are stored.

Another example (e.g. example 36) relates to a previously-described example (e.g. one or more of examples 31-35), wherein the write pointer associated with the first vector processor instruction and the second vector processor instruction indicates the same starting address location in the output buffer.

Another example (e.g. example 37) relates to a previously-described example (e.g. one or more of examples 31-36), wherein the vector processor means performs the first vector processing operation and the second vector processing operation without retrieving additional vector data samples from the one or more vector register means.

Another example (e.g. example 38) relates to a previously-described example (e.g. one or more of examples 31-37), wherein: the buffer means comprises a further output buffer, the vector processing circuitry is configured to perform the first vector processing operation and the second vector processing operation as part of a plurality of vector processing operations associated with cascaded vector processing operation such that the vector processing circuitry is configured to, for a third vector processor instruction that is executed during a third one of a plurality of clock cycles, perform a third vector processing operation using one or more of a set of vector data samples that are read from the output buffer, with the results of the vector processing circuitry performing the third vector processing operation being stored in the further output buffer.

Another example (e.g. example 39) relates to a previously-described example (e.g. one or more of examples 31-38), wherein: the set of vector data samples are stored in the buffer means over an address range, the buffer means, upon completion of the second vector processing operation, overwrites the set of vector data samples stored in the address range with a further set of vector samples retrieved from the one or more vector registers, and the vector processing means performs, for a third vector processor instruction that is executed during a third one of the plurality of clock cycles, a third vector processing operation by reading a portion of the further set of vector data samples stored in the buffer means over the address range.

Another example (e.g. example 40) relates to a previously-described example (e.g. one or more of examples 31-39), wherein the first vector processing operation and the second vector processing operation each perform digital signal processing operations for wireless communications.

An apparatus as shown and described.

A method as shown and described.

CONCLUSION

The aforementioned description will so fully reveal the general nature of the disclosure that others can, by applying knowledge within the skill of the art, readily modify and/or adapt for various applications the techniques described herein without undue experimentation, and without departing from the general concept of the present disclosure. Therefore, such adaptations and modifications are intended to be within the meaning and range of equivalents of the disclosed techniques, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "techniques," "implementations," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The implementations described herein are provided for illustrative purposes, and are not limiting. Other implementations are possible, and modifications may be made to the implementations as described herein. Therefore, the specification is not meant to limit the disclosure. Rather, the scope of the disclosure is defined only in accordance with the following claims and their equivalents.

The various techniques described herein may be implemented in hardware (e.g., circuits), firmware, software, or any combination thereof. The various techniques may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to the various techniques as described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the various techniques described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A vector processing unit, comprising:
a buffer configured to store a set of vector data samples that are retrieved from one or more vector registers; and
vector processing circuitry configured to:
for a first vector processor instruction that is executed during a first one of a plurality of clock cycles, perform a first vector processing operation using a first portion of the stored set of vector data samples,
for a second vector processor instruction that is executed during a second one of the plurality of clock cycles, perform a second vector processing operation using a second portion of the stored set of vector data samples,
wherein a predetermined number of the first portion of the stored set of vector data samples used to perform the first vector processing operation are the same as the second portion of the stored set of vector data samples used to perform the second vector processing operation.

2. The vector processing unit of claim 1, wherein the first vector processor instruction and the second vector processor instruction each includes a read pointer indicating a respective starting address location of the buffer from which the first portion of the stored set of vector data samples and the second portion of the stored set of vector data samples are read, respectively, to perform each respective first and second vector processing operation.

3. The vector processing unit of claim 1, wherein:
the first vector processor instruction includes a first read pointer indicating a first starting address location of the buffer from which the first portion of the stored set of vector data samples are read,
the second vector processor instruction includes a second read pointer indicating a second starting address location of the buffer from which the second portion of the stored set of vector data samples are read, and
the first starting address location and the second starting address location of the buffer are offset from one another by an address range that is less than an address range spanned by the set of vector data samples.

4. The vector processing unit of claim 1, wherein:
the buffer comprises an input buffer and an output buffer,
the set of vector data samples retrieved from the one or more vector registers are stored in the input buffer, and
results of the vector processing circuitry performing the first and the second vector processing operation on the first portion of the stored set of vector data samples and the second portion of the stored set of vector data samples, respectively, are stored in the output buffer.

5. The vector processing unit of claim 4, wherein the first vector processor instruction and the second vector processor instruction each includes a write pointer indicating a respective starting address location in the output buffer at which the results of the vector processing circuitry performing the first and the second vector processing operation on the first portion of the stored set of vector data samples and the second portion of the stored set of vector data samples, respectively, are stored.

6. The vector processing unit of claim 5, wherein the write pointer associated with the first vector processor instruction and the second vector processor instruction indicates the same starting address location in the output buffer.

7. The vector processing unit of claim 1, wherein the vector processing circuitry is configured to perform the first vector processing operation and the second vector processing operation without retrieving additional vector data samples from the one or more vector registers.

8. The vector processing unit of claim 4, wherein:
the buffer comprises a further output buffer, and
the vector processing circuitry is configured to:
perform the first vector processing operation and the second vector processing operation as part of a plurality of vector processing operations associated with cascaded vector processing operations such that the vector processing circuitry is configured, for a third vector processor instruction that is executed during a third one of a plurality of clock cycles, to perform a third vector processing operation using one or more of a set of vector data samples that are read from the output buffer, with the results of the vector processing circuitry performing the third vector processing operation being stored in the further output buffer.

9. The vector processing unit of claim 1, wherein:
the set of vector data samples are stored in the buffer over an address range,
the buffer is configured, upon completion of the second vector processing operation, to overwrite the set of vector data samples stored in the address range with a further set of vector samples retrieved from the one or more vector registers, and
the vector processing circuitry is configured to perform, for a third vector processor instruction that is executed during a third one of the plurality of clock cycles, a third vector processing operation by reading a portion of the further set of vector data samples stored in the buffer over the address range.

10. The vector processing unit of claim 1, wherein the first vector processing operation and the second vector processing operation comprise digital signal processing operations for wireless communications.

11. A system on a chip (SoC), comprising:
a plurality of vector registers; and
a plurality of vector processing units, each one of the plurality of vector processing units comprising:
a buffer configured to store a set of vector data samples that are retrieved from one or more of the plurality of vector registers; and
vector processing circuitry configured to:
for a first vector processor instruction that is executed during a first one of a plurality of clock cycles, perform a first vector processing operation using a first portion of the stored set of vector data samples, and
for a second vector processor instruction that is executed during a second one of the plurality of clock cycles, perform a second vector processing operation using a second portion of the stored set of vector data samples,
wherein a predetermined number of the first portion of the stored set of vector data samples used to perform the first vector processing operation are the same as the second portion of the stored set of vector data samples used to perform the second vector processing operation.

12. The SoC of claim 11, wherein the first vector processor instruction and the second vector processor instruction each includes a read pointer indicating a respective starting address location of the buffer from which the first portion of the stored set of vector data samples and the second portion of the stored set of vector data samples are read, respectively, to perform each respective first and second vector processing operation.

13. The SoC of claim 11, wherein:
the first vector processor instruction includes a first read pointer indicating a first starting address location of the buffer from which the first portion of the stored set of vector data samples are read,
the second vector processor instruction includes a second read pointer indicating a second starting address location of the buffer from which the second portion of the stored set of vector data samples are read, and
the first starting address location and the second starting address location of the buffer are offset from one another by an address range that is less than an address range spanned by the set of vector data samples.

14. The SoC of claim 11, wherein:
the buffer comprises an input buffer and an output buffer,
the set of vector data samples retrieved from the one or more vector registers are stored in the input buffer, and
results of the vector processing circuitry performing the first and the second vector processing operation on the first portion of the stored set of vector data samples and the second portion of the stored set of vector data samples, respectively, are stored in the output buffer.

15. The SoC of claim 14, wherein the first vector processor instruction and the second vector processor instruction each includes a write pointer indicating a respective starting address location in the output buffer at which the results of the vector processing circuitry performing the first and the second vector processing operation on the first portion of the stored set of vector data samples and the second portion of the stored set of vector data samples, respectively, are stored.

16. The SoC of claim 15, wherein the write pointer associated with the first vector processor instruction and the second vector processor instruction indicates the same starting address location in the output buffer.

17. The SoC of claim 11, wherein the vector processing circuitry is configured to perform the first vector processing operation and the second vector processing operation without retrieving additional vector data samples from the one or more vector registers.

18. The SoC of claim 14, wherein:

the buffer comprises a further output buffer, and the vector processing circuitry is configured to:

perform the first vector processing operation and the second vector processing operation as part of a plurality of vector processing operations associated with cascaded vector processing operation such that the vector processing circuitry is configured, for a third vector processor instruction that is executed during a third one of a plurality of clock cycles, to perform a third vector processing operation using one or more of a set of vector data samples that are read from the output buffer, with the results of the vector processing circuitry performing the third vector processing operation being stored in the further output buffer.

19. The SoC of claim 11, wherein:

the set of vector data samples are stored in the buffer over an address range, the buffer is configured, upon completion of the second vector processing operation, to overwrite the set of vector data samples stored in the address range with a further set of vector samples retrieved from the one or more vector registers, and the vector processing circuitry is configured to perform, for a third vector processor instruction that is executed during a third one of the plurality of clock cycles, a third vector processing operation by reading a portion of the further set of vector data samples stored in the buffer over the address range.

20. The SoC of claim 11, wherein the first vector processing operation and the second vector processing operation comprise digital signal processing operations for wireless communications.

* * * * *